(12) United States Patent
Tamiya et al.

(10) Patent No.: US 12,729,984 B2
(45) Date of Patent: Sep. 8, 2026

(54) DISPLACEMENT DETECTING APPARATUS

(71) Applicant: Magnescale Co., Ltd., Kanagawa (JP)

(72) Inventors: Hideaki Tamiya, Kanagawa (JP); Shun Okuyama, Kanagawa (JP); Akinori Ebine, Kanagawa (JP)

(73) Assignee: Magnescale Co., Ltd., Kanagawa (JP)

( * ) Notice: Subject to any disclaimer, the term of this patent is extended or adjusted under 35 U.S.C. 154(b) by 36 days.

(21) Appl. No.: 19/069,935

(22) Filed: Mar. 4, 2025

(65) Prior Publication Data

US 2025/0347537 A1 Nov. 13, 2025

(30) Foreign Application Priority Data

Mar. 5, 2024 (JP) ................................ 2024-032722
Jun. 12, 2024 (JP) ................................ 2024-095413

(51) Int. Cl.
*G01D 5/30* (2006.01)

(52) U.S. Cl.
CPC .................................. *G01D 5/305* (2013.01)

(58) Field of Classification Search
CPC . G01B 11/026; G02F 1/13363; H10P 74/203; G01N 21/956
See application file for complete search history.

(56) References Cited

U.S. PATENT DOCUMENTS

2020/0088510 A1* 3/2020 Okuyama .......... G02F 1/13363

FOREIGN PATENT DOCUMENTS

JP 2013152205 A 8/2013
JP 2020046273 A 3/2020

* cited by examiner

*Primary Examiner* — Maurice C Smith
(74) *Attorney, Agent, or Firm* — IP Business Solutions, LLC.

(57) ABSTRACT

[Problem] To provide a displacement detection apparatus that offers high measurement accuracy while maintaining high versatility.
[Solution] A second birefringent unit 121 and a third birefringent unit 123 are configured to change the phase difference between the first light beam L1 and the second light beam L2 in response to movement of the target T in the measurement direction.

7 Claims, 24 Drawing Sheets

(A)

(B)

(C)

(D)

DISPLACEMENT DETECTING APPARATUS

TECHNICAL FIELD

The present invention relates to a displacement detection apparatus for non-contact measurement of displacement in the measurement direction of a measurement target member using light.

BACKGROUND ART

An optical displacement detection apparatus is known as an apparatus for non-contact measurement of displacement in a specific direction of a measurement target member. Such displacement detection apparatuses are used, for example, to measure the displacement of a semiconductor wafer or photomask in a specific direction.

Patent Document 1 discloses a displacement detection apparatus using light interference. This displacement detection apparatus includes a light source for emitting light, a beam-splitting unit, a diffraction grating, a reflecting unit, a beam-combining unit, a light-receiving unit, and a relative position information output unit. In this apparatus, one of the light beams split by the beam-splitting unit is used as reference light, while the other is directed onto the measurement surface of the measurement target member as object light. Each of the reference light and the object light is diffracted by the diffraction grating within the displacement detection apparatus and then superimposed again by the beam-combining unit. As a result, the reference light and the object light interfere with each other. The light-receiving unit receives the interference light. The relative position information output unit outputs displacement information in the height direction of the measurement surface based on the intensity of the interference light received.

Patent Document 2 discloses a displacement detection apparatus that utilizes changes in polarization. In this displacement detection apparatus, a birefringent prism is attached to the measurement target member. When light is incident on a birefringent prism, it is split into two beams with different phases due to the difference in refractive index. When the measurement target member moves laterally from this state, the optical path length of the light passing through the birefringent prism changes. As a result, the phase difference between the two beams also changes. The displacement detection apparatus measures the lateral movement of the birefringent prism, that is, the lateral displacement of the measurement target member, based on changes in the phase difference between the two beams.

PRIOR ART DOCUMENTS

Patent Documents

[Patent Document 1] Japanese Unexamined Patent Publication No. 2013-152205

[Patent Document 2] Japanese Unexamined Patent Publication No. 2020-046273

SUMMARY OF THE INVENTION

Problem to be Solved

The displacement detection apparatus of Patent Document 1 is configured such that when the measurement surface is displaced in the height direction, the position of the object light incident on the diffraction grating is displaced by twice that amount in the height direction. In this displacement detection apparatus, the reference light and the object light are made to interfere with each other, and displacement is measured from the interference signal. When the measurement surface moves by one period of the diffraction grating in the height direction, the interference signal shifts by two periods. Accordingly, this interference-based displacement detection apparatus is capable of measuring displacement in the height direction of the measurement surface with extremely high resolution. Furthermore, in this displacement detection apparatus, the object light can be incident on the measurement surface at an oblique angle. Therefore, this displacement detection apparatus can directly measure the displacement in the height direction of a wafer or photomask, while avoiding exposure equipment for semiconductor wafers or direct-writing equipment for photomasks that are installed above the measurement surface.

In exposure equipment for semiconductor wafers and direct-writing equipment for photomasks, the wafer or photomask is sometimes slightly tilted (e.g., by a few milliradians). Therefore, displacement detection apparatuses are required to accommodate a wider range of orientation changes of the measurement surface while still enabling high-precision measurement of displacement in the height direction.

In the displacement detection apparatus of Patent Document 1, the principle of interfering the object light and the reference light makes the interference intensity prone to decrease when the orientation of the measurement surface changes. Therefore, in interference-based displacement detection apparatuses, the allowable range of orientation change of the measurement surface is small (e.g., typically only a few milliradians), resulting in limited versatility.

On the other hand, in the displacement detection apparatus of Patent Document 2, the direct measurement target is a birefringent prism, and it detects displacement of the birefringent prism in the lateral direction. Therefore, it is difficult to directly measure the displacement in the height direction of a wafer or photomask.

Also, as disclosed in Patent Document 2, when light from a light source is split into two beams using a birefringent prism, the refractive index for each beam differs depending on the polarization direction. Therefore, in the displacement detection apparatus of Patent Document 2, a compensating prism is provided in the optical path to align the wavefront inclinations of the two beams. However, when the two beams passing through the birefringent prism have different refractive indices, they diverge from each other after passing through the birefringent prism. In the displacement detection apparatus of Patent Document 2, the displacement detection unit receiving the two light beams detects the displacement of the birefringent prism based on the phase difference between the two light beams. Therefore, it is essential for the displacement detection unit to receive both beams, making it difficult to increase the distance between the birefringent prism and the displacement detection unit. In other words, the amount of polarization change (detection resolution) by the birefringent prism and the distance between the birefringent prism and the displacement detection unit are in a trade-off relationship. For example, in order for the displacement detection apparatus to achieve nanometer-level resolution, the distance between the birefringent prism and the displacement detection unit must be kept within several tens of millimeters. To allow light to enter the exposure position of a semiconductor wafer or photomask from an oblique angle and directly measure displacement in the height direction, it may be necessary, for example, to set the distance between the birefringent prism and the displacement detection unit to 500 mm or more. In the displacement detection apparatus described of Patent Document 2, it is difficult to achieve nanometer-level measurement resolution while maintaining a large distance between the birefringent prism and the displacement detection unit, resulting in limited versatility.

The present invention provides a displacement detection apparatus that detects displacement in the height direction of an object to be measured, offering high measurement accuracy while ensuring high versatility.

Solution to Problem

The displacement detection apparatus of the present invention is an apparatus that detects displacement of a target in a measurement direction, including:

a light source that emits light;

a first birefringent unit that is provided in an optical path from the light source to the target to which the light is emitted, and splits the light into a first light beam and a second light beam having a phase difference with respect to the first light beam;

a second birefringent unit that is provided in optical paths of the first light beam and the second light beam each reflected from the target and refracts the first light beam and the second light beam;

a third birefringent unit that is provided in optical paths of the first light beam and the second light beam that have passed through the second birefringent unit, and converges the first light beam and the second light beam;

a fourth birefringent unit that is provided in optical paths of the first light beam and the second light beam that have passed through the third birefringent unit, and superimposes the first light beam and the second light beam; and a displacement detection unit that detects displacement of the target in the measurement direction based on a change in the phase difference between the first light beam and the second light beam that have passed through the fourth birefringent unit, wherein the second birefringent unit and the third birefringent unit are configured to vary the phase difference between the first light beam and the second light beam according to movement of the target in the measurement direction.

Advantageous Effect of the Invention

In the displacement detection apparatus of the present invention, the first light beam and the second light beam, which are split by the first birefringent unit, are superimposed by passing through the second, third, and fourth birefringent units. Since separation between the first light beam and the second light beam is suppressed, the displacement detection unit can receive both light beams even if the optical path length from the light source to the displacement detection unit is long. As a result, the displacement detection apparatus can measure displacement of the target in the measurement direction from various positions, offering high versatility. Additionally, in the displacement detection apparatus, both the first light beam and the second light beam that have passed through the first birefringent unit are reflected by the same target. Therefore, the relative angular change between the first light beam and the second light beam is suppressed between the point at which they exit the first birefringent unit and the point at which they enter the second birefringent unit. Accordingly, even if the target is tilted, displacement of the target in the measurement direction can be measured without being affected by the tilt. Thus, the displacement detection apparatus provides high measurement accuracy while enhancing versatility.

DETAILED DESCRIPTION

Particular embodiments of the present invention are described below with reference to the drawings. The embodiments described below are merely examples. The present invention is not to be interpreted as being limited to the embodiments described below.

First Embodiment

First, the configuration of the displacement detection apparatus of the first embodiment will be outlined.

Figure 1:
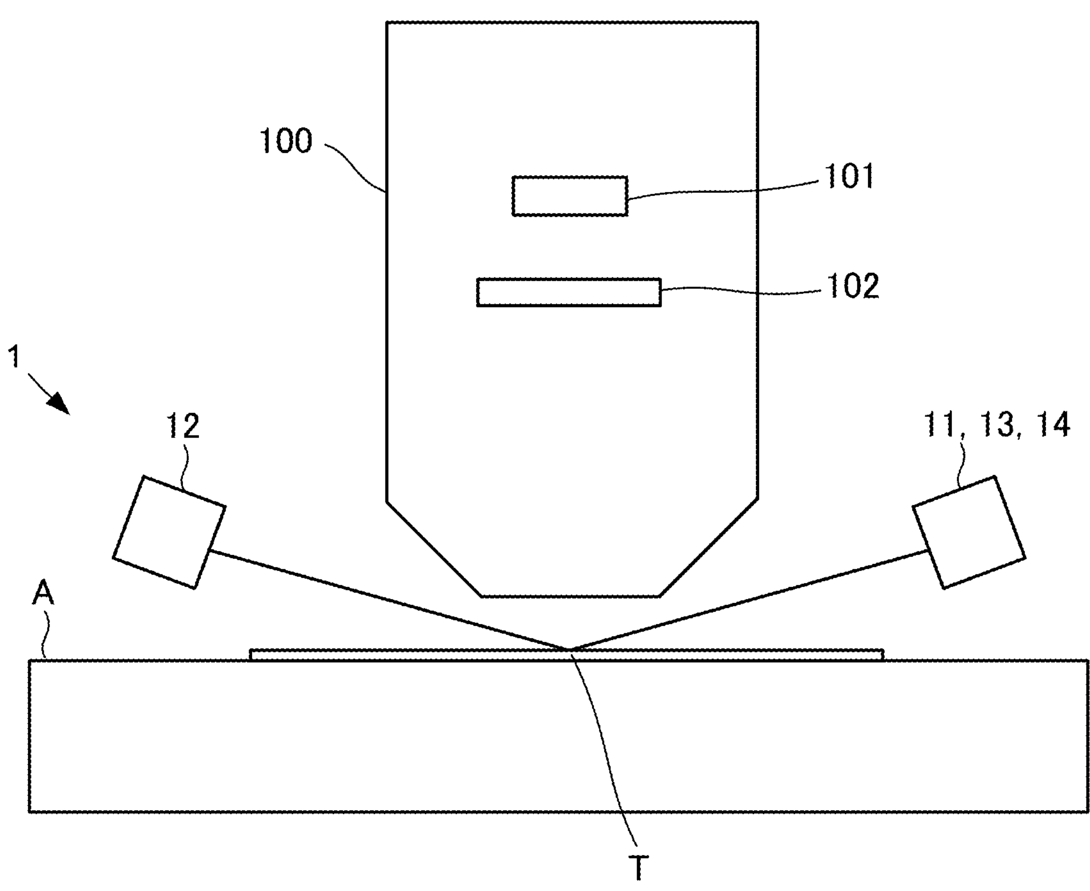
FIG. 1 is a schematic diagram showing an example application of the displacement detection apparatus according to the first embodiment.
Figure 1:
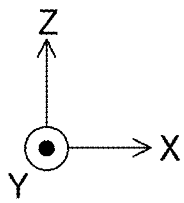

FIG. 1 is a schematic diagram showing an example application of the displacement detection apparatus of the first embodiment. A displacement detection apparatus 1 measures displacement of a target T in the Z-direction (measurement direction). In the present embodiment, the object to be measured is the surface of a semiconductor wafer. The target T is a part of the surface of the semiconductor wafer. The target T is defined as the area within the object to be measured where light is emitted. A semiconductor wafer is placed on a stage A. A circuit pattern is formed on the surface of the semiconductor wafer. The circuit pattern is formed on the surface of the semiconductor wafer by light (e.g., UV) emitted by a projection optical apparatus 100.

The surface of the semiconductor wafer placed on the stage A is not necessarily flat. It is also possible that, when a semiconductor wafer is mounted on the stage A, its position in the height (Z) direction fluctuates or it is mounted in a tilted state. In such cases, the distance between the projection optical apparatus 100 and the target T will fluctuate. As a result, when exposure is performed on the semiconductor wafer, the image may become blurred, or the magnification and exposure position may shift. Therefore, the displacement detection apparatus 1 is used to measure the Z-direction displacement of the target T.

More specifically, in semiconductor wafer manufacturing, a photosensitive resist is first applied to the surface of a semiconductor wafer. Subsequently, an exposure light source 101 of the projection optical apparatus 100 emits light. A mask 102, on which a circuit pattern is formed, is provided in the optical path of the light from the exposure light source 101. The light from the exposure light source 101 passes through the mask 102 and exposes the object to be measured. As a result, the surface of the semiconductor wafer is exposed by the exposure light source 101, and the circuit pattern is transferred. Although not shown in the figure, various members such as lenses are provided in the projection optical apparatus 100. The lens focuses the image to be transferred (circuit pattern) so that it aligns with the surface of the semiconductor wafer.

When exposing a semiconductor wafer, the distance between the projection optical apparatus 100 and the semiconductor wafer must be kept constant in order to achieve proper focus. Therefore, the height at the exposure position on the semiconductor wafer surface must be accurately identified. In addition, when multiple layers of circuit patterns are transferred onto the surface of a semiconductor wafer, the semiconductor wafer surface may warp. Accordingly, it is necessary to adjust the focus based on the warping of the semiconductor wafer surface—that is, to focus according to the exposure position. To address this, after measuring the height of the semiconductor wafer using the displacement detection apparatus 1 of the present embodiment, exposure is performed on the semiconductor wafer surface by the projection optical apparatus 100.

The displacement detection apparatus 1 includes an illumination unit 11, a light reflection unit 12, a displacement detection unit 13, and a displacement information output unit 14. The illumination unit 11 emits light. The light emitted from the illumination unit 11 is reflected by the target T and reaches the light reflection unit 12. The light reflection unit 12 reflects the received light. The light reflected by the light reflection unit 12 is again reflected by the target T and reaches the displacement detection unit 13. Using the received light, the displacement detection unit 13 measures the displacement of the target T in the Z-direction. Since the projection optical apparatus 100 is installed above the target T, the illumination unit 11, light reflection unit 12, displacement detection unit 13, and displacement information output unit 14 are arranged obliquely above the target T. The light emitted from the illumination unit 11 is incident on the target T at an oblique angle.

The illumination unit 11, light reflection unit 12, displacement detection unit 13, and displacement information output unit 14 are preferably fixed by a single housing. All of the illumination unit 11, displacement detection unit 13, and displacement information output unit 14 may also be configured as a single integrated member. The illumination unit 11, displacement detection unit 13, and displacement information output unit 14 may be separate components, or some of them may be separate. The displacement information output unit 14 is composed of an arithmetic processing circuit such as a CPU. The displacement information output unit 14 performs various processes described later by executing a computer program stored on a recording medium.

In this specification, the Z-direction is defined as being parallel to the vertical direction, with the upward direction designated as the +Z-direction and the downward direction as the −Z-direction. The X direction is defined as the direction orthogonal to the Z-direction within the plane including the Z-direction and the optical axis of the light emitted from the illumination unit 11. The Y direction is defined as the direction orthogonal to the Z and X directions.

Figure 2:
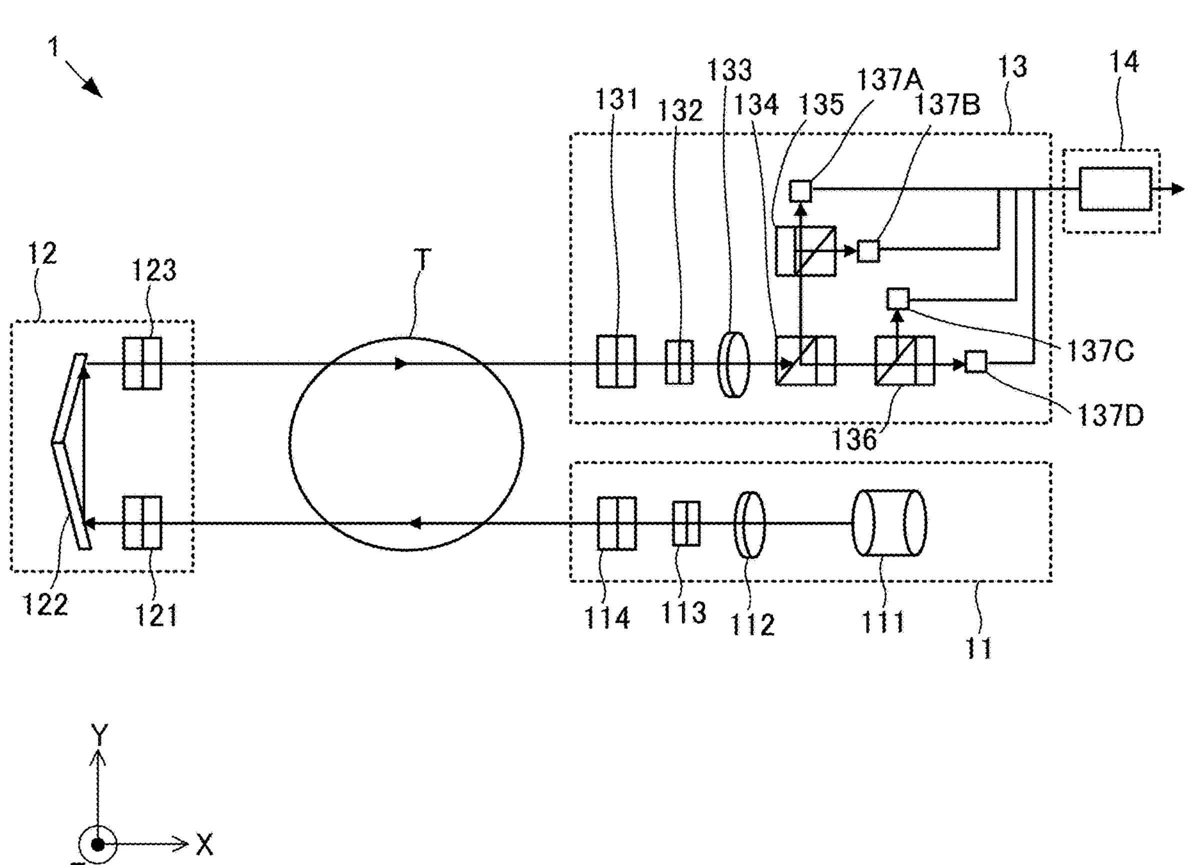
FIG. 2 is a front view showing the configuration of the displacement detection apparatus according to the first embodiment.

FIG. 2 is a front view showing the configuration of the displacement detection apparatus of the first embodiment. The front view corresponds to a top view of the displacement detection apparatus 1. The illumination unit 11 is configured to emit light onto the target T. Specifically, the illumination unit 11 includes a light source 111, a collimator lens 112, a polarizer 113, and a first birefringent unit 114.

The light source 111 emits light. The light source 111 is, for example, a semiconductor laser, LED (Light Emitting Diode), SLD (Super Luminescent Diode), gas laser, or solid-state laser. The type of light source 111 is not particularly limited. The light source 111 may emit coherent light. It is sufficient that the light source 111 can emit light whose polarization state is changed by a birefringent unit.

The collimator lens 112 is provided in the optical path of the light emitted from the light source 111. The collimator lens 112 converts light emitted from the light source 111 into a plane wave. However, the collimator lens 112 does not need to generate a perfectly planar wave. The collimator lens 112 may have, for example, an accuracy on the order of the wavelength λ of the light within the effective diameter of the beam. In the present embodiment, a configuration in which the illumination unit 11 includes the collimator lens 112 is described, but the illumination unit 11 may also be configured without the collimator lens 112. For example, beams emitted from a gun such as a HeNe laser have high wavefront precision. In such cases, the collimator lens 112 may be omitted.

The polarizer 113 is provided in the optical path of the light that has passed through the collimator lens 112. The polarizer 113 receives the light passing through the collimator lens 112. The polarizer 113 changes the polarization state of the received light. The polarizer 113 converts the received light into light with a specific polarization direction. The polarizer 113 may be, for example, a polarizing plate. In the present embodiment, a configuration in which the illumination unit 11 includes the polarizer 113 is described; however, the polarizer 113 may be omitted.

The first birefringent unit 114 is provided in the optical path from the light source 111 to the target T. The first birefringent unit 114 receives the light that has passed through the polarizer 113. The first birefringent unit 114 causes birefringence in the received light. The first birefringent unit 114 may be, for example, a quartz plate. However, the first birefringent unit 114 is not particularly limited, as long as it has the function of causing birefringence in the received light. The first birefringent unit 114 may also be a thin film or the like.

The light reflection unit 12 receives light emitted from the illumination unit 11 and reflected by the target T. The light reflection unit 12 reflects the received light. The light reflection unit 12 reflects the received light and directs it back to the target T. Specifically, the light reflection unit 12 includes a second birefringent unit 121, a reflective member 122, and a third birefringent unit 123.

The second birefringent unit 121 is provided in the optical path of the light reflected by the target T. The second birefringent unit 121 receives the light reflected by the target T. The second birefringent unit 121 causes birefringence in the received light. The second birefringent unit 121 may be, for example, a quartz plate. However, the second birefringent unit 121 is not particularly limited, as long as it has the function of causing birefringence in the received light. The second birefringent unit 121 may also be a thin film or the like.

The reflective member 122 is provided between the second birefringent unit 121 and the third birefringent unit 123 along the optical path. The reflective member 122 receives the light that has passed through the second birefringent unit 121. The reflective member 122 reflects the received light. The reflective member 122 reflects the received light in such a way that it is turned back. The reflective member 122 is configured to direct the received light to be incident on the third birefringent unit 123. The reflective member 122 is not particularly limited. The reflective member 122 is, for example, a corner cube mirror.

The third birefringent unit 123 is provided in the optical path from the reflective member 122 to the target T. In other words, the third birefringent unit 123 is provided in the optical path of the light that has passed through the second birefringent unit 121. The third birefringent unit 123 receives the light reflected by the reflective member 122. The third birefringent unit 123 causes birefringence in the received light. The third birefringent unit 123 may be, for example, a quartz plate. However, the third birefringent unit 123 is not particularly limited, as long as it has the function of causing birefringence in the received light. The third birefringent unit 123 may also be a thin film or the like.

The displacement detection unit 13 includes a fourth birefringent unit 131. The displacement detection unit 13 also includes a plurality of functional units for measuring the displacement of the target T in the Z-direction based on the received light. These units will be described later.

The fourth birefringent unit 131 is provided in the optical path of the light that has passed through the third birefringent unit 123. The fourth birefringent unit 131 receives the light that has passed through the third birefringent unit 123 and has been reflected by the target T. The fourth birefringent unit 131 causes birefringence in the received light. The fourth birefringent unit 131 may be, for example, a quartz plate. However, the fourth birefringent unit 131 is not particularly limited, as long as it has the function of causing birefringence in the received light. The fourth birefringent unit 131 may also be a thin film or the like.

Figure 3:
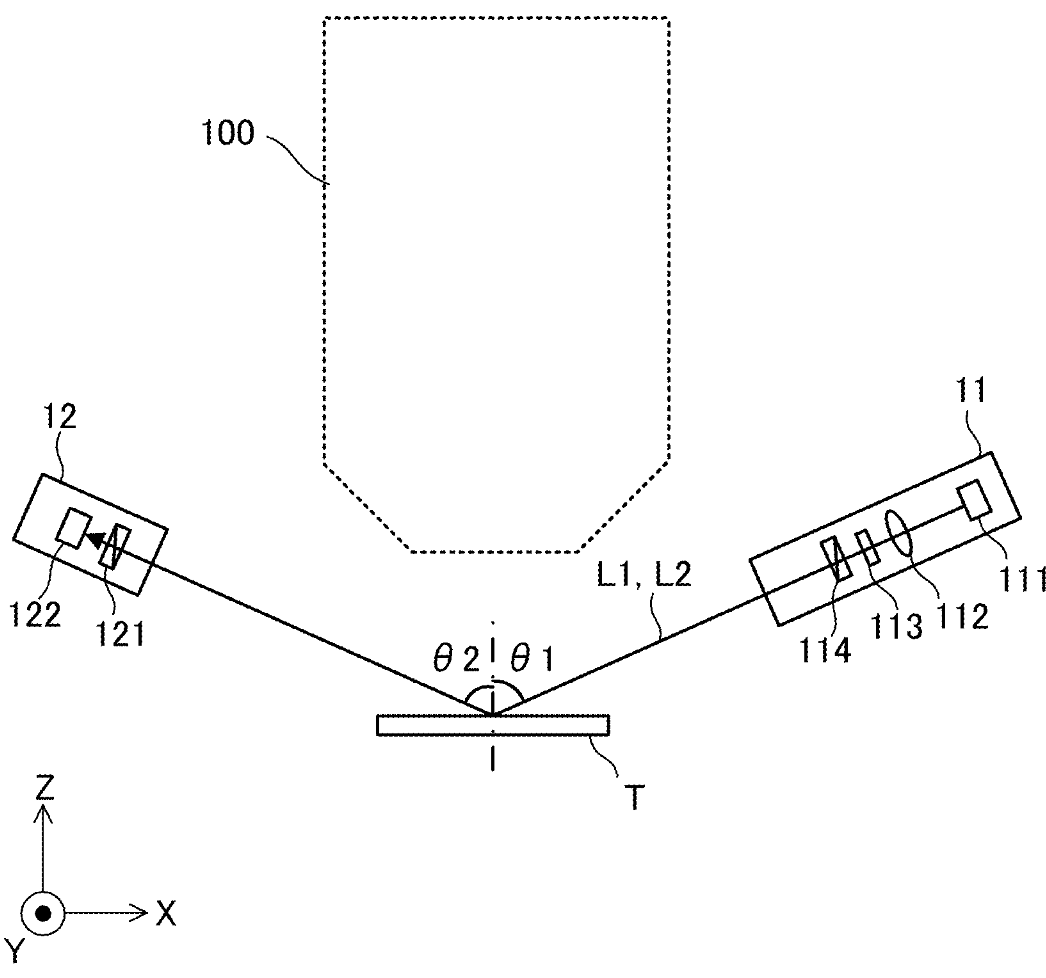
FIG. 3 is a side view showing the configuration of the illumination unit and the light reflection unit according to the first embodiment.

FIG. 3 is a side view showing the configuration of the illumination unit and the light reflection unit of the first embodiment. The side view corresponds to a view of the displacement detection apparatus 1 from the side (Y direction). In this figure, the optical path of the light emitted from the light source 111 to the reflective member 122, that is, the forward optical path of the light, is shown. The light from the illumination unit 11 is incident on the target T at an angle inclined with respect to the measurement direction (Z-direction). The angle of incidence θ1 on the target T is, for example, 85 degrees. However, the angle of incidence θ1 is not limited to 85 degrees and may be appropriately set. The angle of incidence θ1 is greater than 0 degrees. The angle of incidence θ1 is less than 90 degrees. For example, in cases where the projection optical apparatus 100, which is an exposure apparatus, is installed above the target T, the distance between the projection lens of the projection optical apparatus and the target is short. In such cases, the angle of incidence θ1 is set, for example, to 85 degrees or greater. The angle of incidence θ1 is set within a range that allows the displacement detection apparatus 1 to measure displacement in the Z-direction of the target with the projection optical apparatus 100 installed above the target. The light from the illumination unit 11 is reflected by the target T and travels toward the light reflection unit 12. The angle of reflection θ2 of the light from the illumination unit 11 is equal to the angle of incidence θ1. That is, θ1=θ2.

Figure 4:
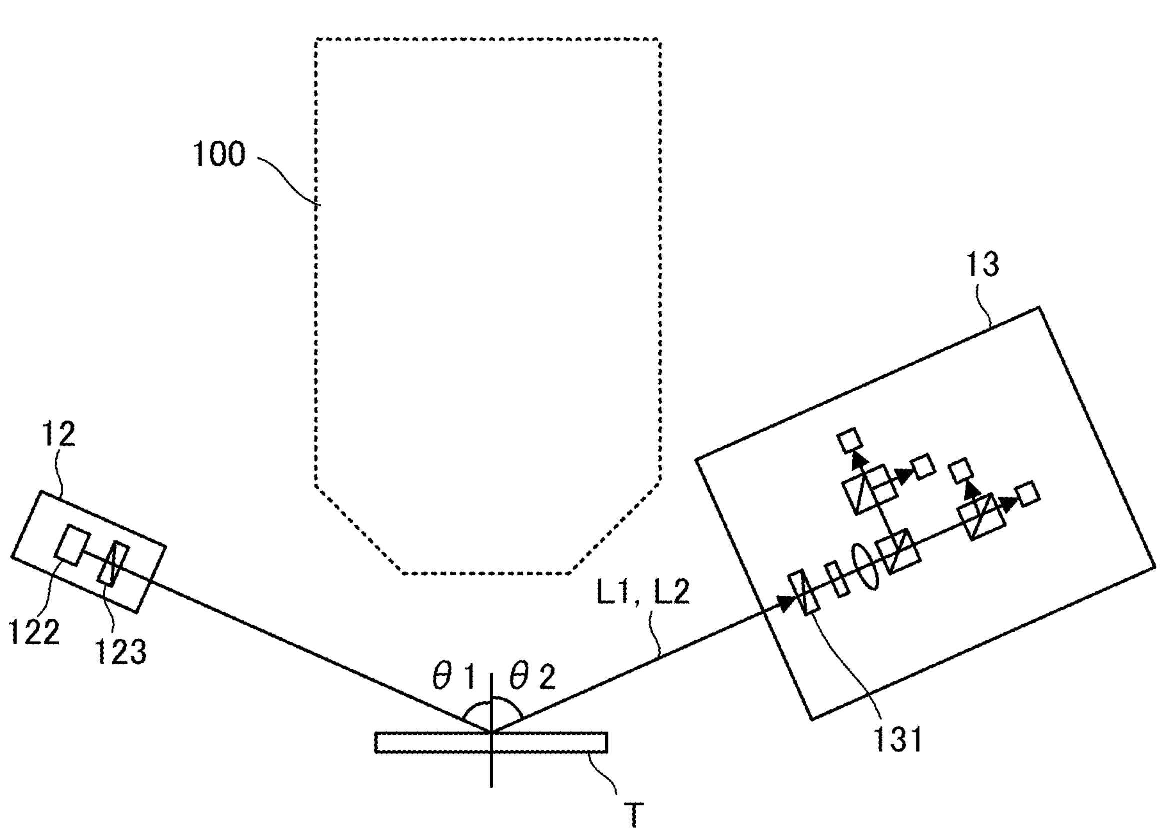
FIG. 4 is a side view showing the configuration of the light reflection unit and the displacement detection unit according to the first embodiment.
Figure 4:
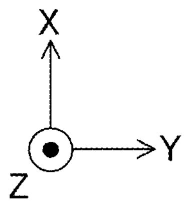

FIG. 4 is a side view showing the configuration of the light reflection unit and the displacement detection unit of the first embodiment. In this figure, the optical path of the light reflected by the reflective member 122 until it reaches the displacement detection unit 13, that is, the return path of the light, is shown. The light reflected by the light reflection unit 12 is inclined with respect to the Z-direction and enters the target T again. The angle of incidence to the target T is θ1. That is, the light reflection unit 12 is configured such that the angle of incidence to the target T is equal in both the forward and return light paths. The light reflected by the light reflection unit 12 is reflected at the target T at a reflection angle θ2 (equal to θ1) and travels toward the displacement detection unit 13.

Next, the displacement detection apparatus of the first embodiment will be described in detail.

Figure 5:
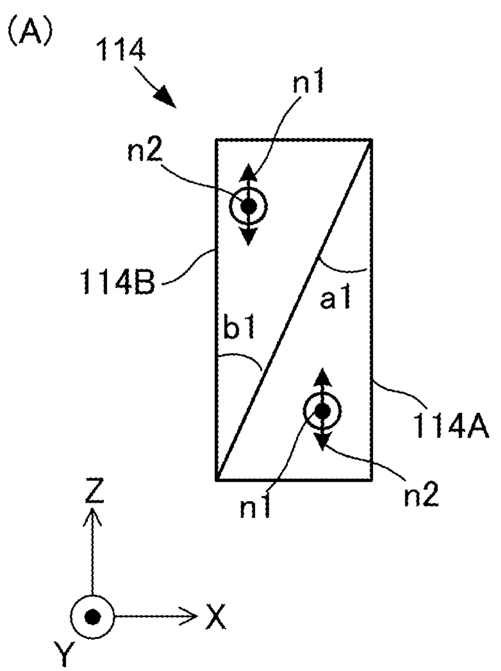
FIG. 5 is a diagram showing the configuration of the first to fourth birefringent units according to the first embodiment.
Figure 5:
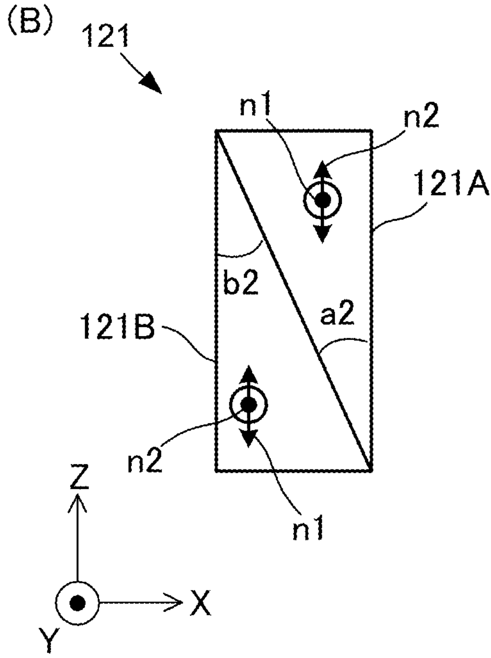
Figure 5:
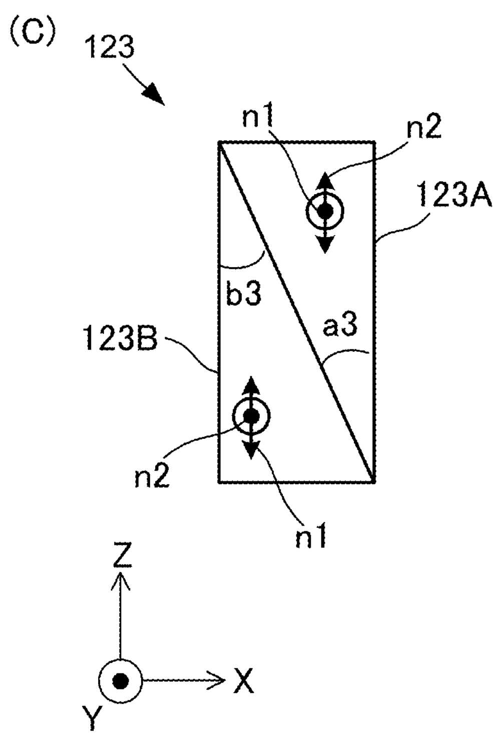
Figure 5:
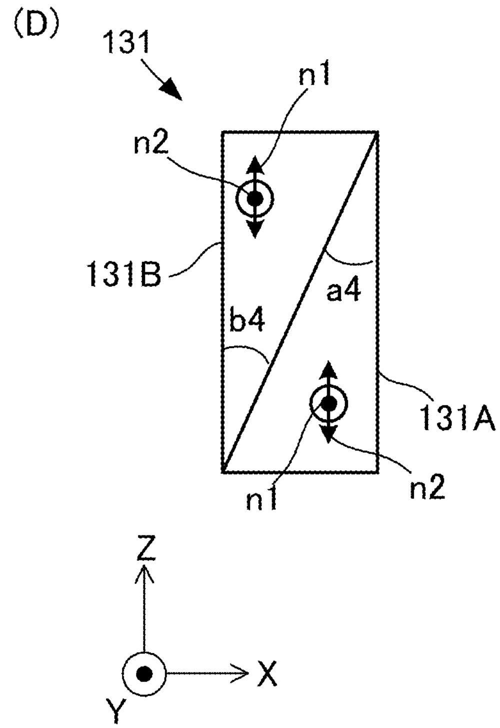

FIG. 5(A) is a diagram showing the configuration of the first birefringent unit. The first birefringent unit 114 is composed of two birefringent units, 114A and 114B. The birefringent unit 114A is provided such that light from the light source 111 is incident on it. The birefringent unit 114A is provided closer to the light source 111 than the birefringent unit 114B along the optical path.

The birefringent unit 114A has a triangular shape in the Z-X plane. In the present embodiment, the birefringent unit 114A is a quartz plate cut at an angle a1. The birefringent unit 114A is configured such that its thickness varies depending on the in-plane position of the incident plane wave of light. The birefringent unit 114A is configured such that its thickness varies along the direction perpendicular to the optical axis in the Z-X plane. The thickness preferably varies linearly. It should be noted that the thickness refers to the length in the direction along the optical axis in the birefringent unit 114A. The same applies to the other birefringent units. The birefringent unit 114A has a crystal axis. The refractive index in the direction of the crystal axis of the birefringent unit 114A is n1. The refractive index in the axis direction perpendicular to the crystal axis of the birefringent unit 114A is n2. The refractive index n2 is different from the refractive index n1.

The birefringent unit 114B is provided such that light that has passed through the birefringent unit 114A is incident on it. The birefringent unit 114B has a triangular shape in the Z-X plane. The birefringent unit 114B has a shape symmetrical to that of the birefringent unit 114A. The birefringent unit 114B has a point-symmetrical shape relative to the birefringent unit 114A in the Z-X plane. The birefringent unit 114B is a quartz plate cut at an angle b1. In the present embodiment, the angle b1 is the same as angle a1, but it may be different.

The birefringent unit 114B is bonded to the birefringent unit 114A. The bonding method is not particularly limited. For example, the birefringent unit 114B may be bonded to the birefringent unit 114A using an optical adhesive. The optical adhesive preferably has high optical transmittance. The optical adhesive is preferably composed of a material that does not change the polarization state of the transmitted light. The birefringent unit 114B is configured such that its thickness varies depending on the in-plane position of the incident plane wave of light. The birefringent unit 114B is configured such that its thickness varies along the direction perpendicular to the optical axis in the Z-X plane. The thickness preferably varies linearly. However, the thickness variation of the birefringent unit 114B is opposite to that of the birefringent unit 114A.

The birefringent unit 114B has a crystal axis. The direction of the crystal axis of birefringent unit 114B is different from that of birefringent unit 114A. In the Y-Z plane, the crystal axis of the birefringent unit 114B is orthogonal to that of the birefringent unit 114A. In the present embodiment, the birefringent unit 114B is made of the same material as the birefringent unit 114A, but it may be made of a different material. The refractive index in the direction of the crystal axis of the birefringent unit 114B is n1. The refractive index in the axis direction orthogonal to the crystal axis of the birefringent unit 114B is n2.

FIG. 5(B) is a diagram showing the configuration of the second birefringent unit. The second birefringent unit 121 is configured to have an optical axis orthogonal to the optical axis of the first birefringent unit 114. In the present embodiment, the second birefringent unit 121 is configured to be symmetrical with respect to the first birefringent unit 114 in the Y-Z plane. The second birefringent unit 121 is preferably composed of the same material as the first birefringent unit 114.

The second birefringent unit 121 is composed of two birefringent units 121A and 121B, each having an optical axis orthogonal to the other. The birefringent unit 121A is provided such that the light reflected by the target T is incident on it. The birefringent unit 121A is provided closer to the target T than the birefringent unit 121B along the optical path.

The birefringent unit 121A has a triangular shape in the Z-X plane. In the present embodiment, the birefringent unit 121A is a quartz plate cut at an angle a2. The angle a2 is preferably the same as the angle a1. The birefringent unit 121A is configured such that its thickness varies depending on the in-plane position of the incident plane wave of light. The birefringent unit 121A is configured to vary in thickness along the direction perpendicular to the optical axis in the Z-X plane. The thickness preferably varies linearly. The birefringent unit 121A has a crystal axis. The refractive index in the crystal axis direction of the birefringent unit 121A is n1. The refractive index in the axial direction perpendicular to the crystal axis of the birefringent unit 121A is n2.

The birefringent unit 121A is configured symmetrically with respect to the birefringent unit 114A in the first birefringent unit 114. The birefringent unit 121A has a crystal axis that is orthogonal, in the Y-Z plane, to the crystal axis of the birefringent unit 114A in the first birefringent unit 114.

The birefringent unit 121B is provided such that light that has passed through the birefringent unit 121A is incident on it. The birefringent unit 121B has a triangular shape in the Z-X plane. The birefringent unit 121B has a point-symmetrical shape with respect to the birefringent unit 121A in the Z-X plane. In the present embodiment, the birefringent unit 121B is a quartz plate cut at an angle b2. In the present embodiment, the angle b2 is the same as angle a2, but it may be different. The birefringent unit 121B is bonded to the birefringent unit 121A. The birefringent unit 121B is configured such that its thickness varies depending on the in-plane position of the incident plane wave of light. The birefringent unit 121B is configured such that its thickness varies along the direction perpendicular to the optical axis in the Z-X plane. The thickness preferably varies linearly. However, the thickness variation of the birefringent unit 121B is opposite to that of the birefringent unit 121A. The birefringent unit 121B has a crystal axis. The direction of the crystal axis of the birefringent unit 121B is different from that of the birefringent unit 121A. In the Y-Z plane, the crystal axis of the birefringent unit 121B is orthogonal to the crystal axis of the birefringent unit 121A. The birefringent unit 121B is preferably made of the same material as the birefringent unit 121A. That is, the refractive index in the direction of the crystal axis of the birefringent unit 121B is n1. The refractive index in the axis direction orthogonal to the crystal axis of the birefringent unit 121B is n2.

In this manner, the first birefringent unit 114 and the second birefringent unit 121 are configured to form an optical pair.

FIG. 5(C) is a diagram showing the configuration of the third birefringent unit, and FIG. 5(D) is a diagram showing the configuration of the fourth birefringent unit. The third birefringent unit 123 and the fourth birefringent unit 131 are configured to form an optical pair, in the same manner as the first birefringent unit 114 and the second birefringent unit 121. The third birefringent unit 123 has a configuration in which a birefringent unit 123A cut at an angle a3 and a birefringent unit 123B cut at an angle b3 are bonded together. The fourth birefringent unit 131 has a configuration in which a birefringent unit 131A cut at an angle a4 and a birefringent unit 131B cut at an angle b4 are bonded together. In the present embodiment, the angles a1, a2, a3, a4, b1, b2, b3, and b4 are the same, but they may be different. Other configurations of the third birefringent unit 123 are the same as those of the second birefringent unit 121 and are therefore omitted. Other configurations of the fourth birefringent unit 131 are the same as those of the first birefringent unit 114 and are also omitted.

Figure 6:
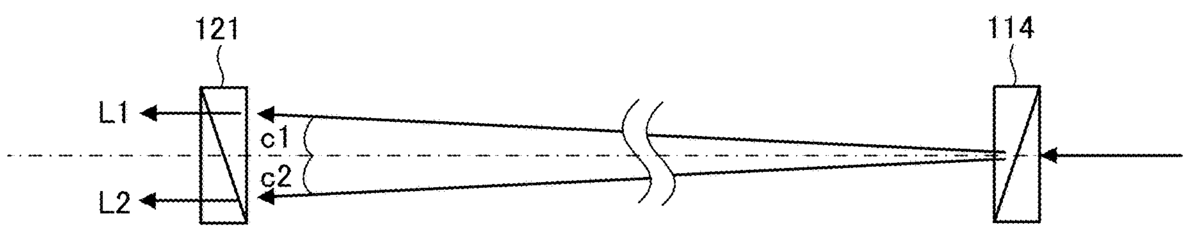
FIG. 6 is a diagram showing the change in the optical axis of light passing through the first birefringent unit and the second birefringent unit.
Figure 6:
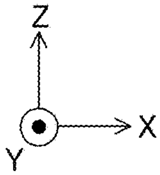

FIG. 6 is a diagram showing the change in the optical axis of the light passing through the first birefringent unit and the second birefringent unit. The first birefringent unit 114 splits the light emitted from the light source 11l into a first light beam L1 and a second light beam L2, which has a polarization state different from that of the first light beam L1. In the first birefringent unit 114, the refractive indices differ between the polarization axis in the Z-direction and that in the Y-direction. Due to this difference in refractive index, the light emitted from the light source 111 is split into the first light beam L1 and the second light beam L2, which is refracted at a different angle from the first light beam L1. Here, the relationship between the refractive index and phase difference in birefringence is expressed by the following equation (1):

$$\text{Phase difference} = 2 \cdot pi \cdot d \cdot (n2 - n1) / \lambda \tag{1}$$

where pi is the mathematical constant, d is the thickness (apparent optical path length) of the portion through which the light passes in the birefringent unit, (n2–n1) is the difference in refractive index, and λ is the wavelength of the light. Thus, due to the difference in refractive indices between the different polarization axes, the second light beam L2 has a phase difference relative to the first light beam L1. The first light beam L1, having passed through the first birefringent unit 114, has an optical axis tilted by an angle c1 relative to the optical axis of the incident light. The second light beam L2 that has passed through the first birefringent unit 114 has an optical axis tilted by an angle c2 relative to the optical axis of the incident light. The second light beam L2 is refracted to the opposite side of the first light beam L1 across the optical axis of the incident light.

The first light beam L1 and the second light beam L2, having passed through the first birefringent unit 114, are reflected by a target (not shown) and enter the second birefringent unit 121. The refractive index of the second birefringent unit 121 is the same as that of the first birefringent unit 114. Therefore, in the second birefringent unit 121, the first light beam L1 is refracted by the angle c1, and the second light beam L2 is refracted by the angle c2. However, as described above, the second birefringent unit 121 has an optical axis orthogonal to that of the first birefringent unit 114. That is, the second birefringent unit 121 is configured to refract the optical axes of the first light beam L1 and the second light beam L2, which were refracted by the first birefringent unit 114, in the opposite direction to that of the first birefringent unit 114. The second birefringent unit 121 is configured to return the optical axes of the first light beam L1 and the second light beam L2, which were refracted by the first birefringent unit 114, to the state before they entered the first birefringent unit 114. The optical axes of the first light beam L1 and the second light beam L2 that have passed through the second birefringent unit 121 become parallel to the optical axis before entering the first birefringent unit 114. The first light beam L1 and the second light beam L2 that have passed through the second birefringent unit 121 pass through the reflective member 122 and enter the third birefringent unit 123.

Figure 7:
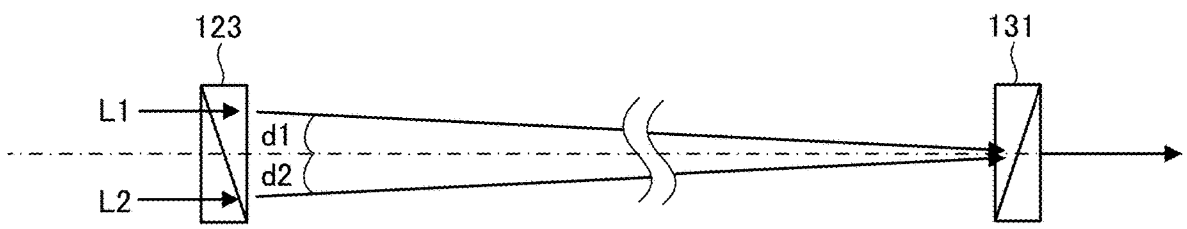
FIG. 7 is a diagram showing the change in the optical axis of light passing through the third birefringent unit and the fourth birefringent unit.
Figure 7:
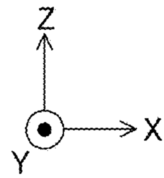

FIG. 7 is a diagram showing the change in the optical axes of light beams passing through the third birefringent unit and the fourth birefringent unit. The third birefringent unit 123 converges the first light beam L1 and the second light beam L2. The first light beam L1 that has passed through the third birefringent unit 123 has an optical axis inclined at an angle d1 relative to the optical axis before entering the third birefringent unit 123. The first light beam L1 is refracted in the third birefringent unit 123 so as to approach the second light beam L2. The second light beam L2 that has passed through the third birefringent unit 123 has an optical axis inclined at an angle d2 relative to the optical axis before entering the third birefringent unit 123. The second light beam L2 is refracted in the third birefringent unit 123 so as to approach the first light beam L1.

The first light beam L1 and the second light beam L2 that have passed through the third birefringent unit 123 are reflected by the target (not shown) and enter the fourth birefringent unit 131. The refractive index of the fourth birefringent unit 131 is the same as that of the third birefringent unit 123. Therefore, in the fourth birefringent unit 131, the first light beam L1 is refracted by the angle d1, and the second light beam L2 is refracted by the angle d2. However, as described above, the fourth birefringent unit 131 has an optical axis orthogonal to the optical axis of the third birefringent unit 123. That is, the fourth birefringent unit 131 is configured to refract the optical axes of the first light beam L1 and the second light beam L2, which were refracted by the third birefringent unit 123, in the direction opposite to that of the third birefringent unit 123. The fourth birefringent unit 131 is configured to return the optical axes of the first light beam L1 and the second light beam L2, which were refracted by the third birefringent unit 123, to the state before they entered the third birefringent unit 123. The optical axes of the first light beam L1 and the second light beam L2 that have passed through the fourth birefringent unit 131 become parallel to the optical axes before entering the third birefringent unit 123.

The fourth birefringent unit 131 superimposes the first light beam L1 and the second light beam L2. The fourth birefringent unit 131 is preferably provided such that the first light beam L1 and the second light beam L2 enter the fourth birefringent unit 131 at the position where they converge. This configuration facilitates the superposition of the first light beam L1 and the second light beam L2.

As described above, in the displacement detection apparatus 1, the first birefringent unit 114 and the second birefringent unit 121 form an optical pair, and the third birefringent unit 123 and the fourth birefringent unit 131 also form an optical pair. As a result, the first light beam L1 and the second light beam L2 that have passed through the fourth birefringent unit 131 become parallel to the light incident on the first birefringent unit 114 and are superimposed. The optical axes of the first light beam L1 and the second light beam L2 that have passed through the fourth birefringent unit 131 are identical or substantially identical.

Figure 8:
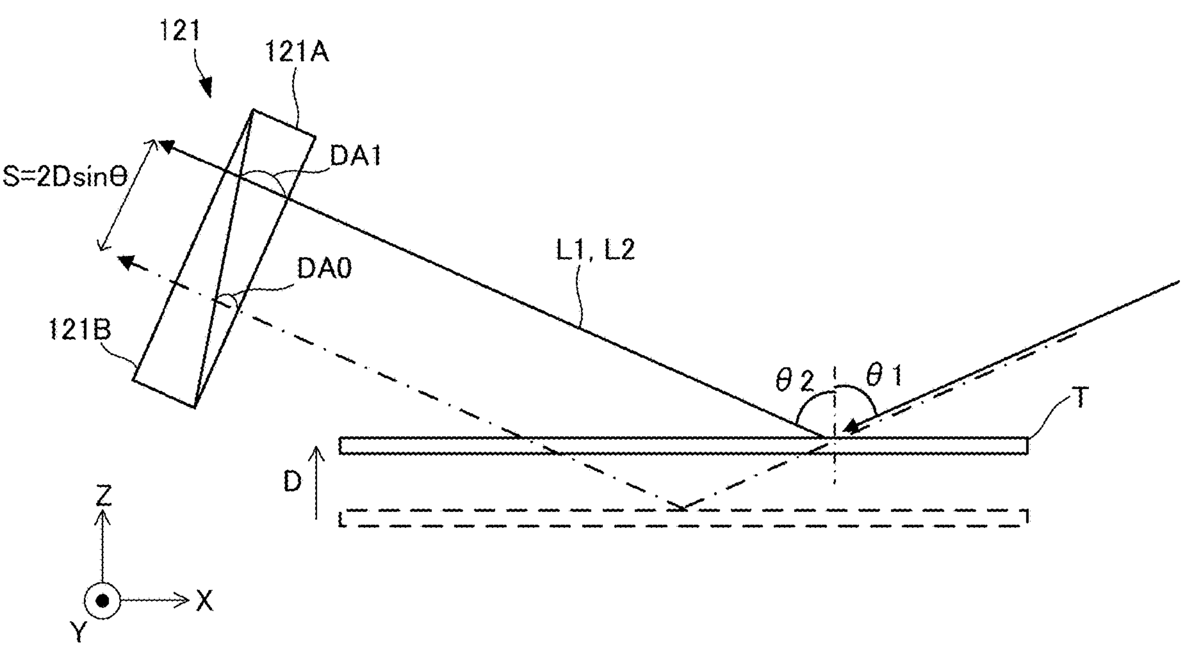
FIG. 8 is a diagram for explaining the phase change of light passing through the second birefringent unit when the target is displaced in the measurement direction.

FIG. 8 is a diagram for illustrating the phase change of light passing through the second birefringent unit when the target is displaced in the measurement direction. In the figure, the dashed line indicates the initial position of the target T, and the solid line indicates the target T displaced by D in the Z-direction from the initial position. As described above, the angle of incidence θ1 of the light that passes through the first birefringent unit and is reflected by the target T is equal to the angle of reflection θ2. When the target T is displaced by D in the Z-direction, the position at which the light enters the second birefringent unit 121 shifts by a displacement amount S in the direction orthogonal to the incident light. Here, S is expressed by the following equation (2). For example, if θ1=85 degrees and D=0.5 mm, then the displacement amount S=1 mm.

$$S = 2 \cdot D \cdot \sin\theta \tag{2}$$

When the target T is not displaced, the first light beam L1 and the second light beam L2 passing through the second birefringent unit 121 do not shift. Therefore, the phase difference between the first light beam L1 and the second light beam L2 does not change. On the other hand, when the target T is displaced by D in the Z-direction, the positions where the first light beam L1 and the second light beam L2 pass through the second birefringent unit 121 change. At this time, in the second birefringent unit 121 as a whole, the apparent optical path length of the first light beam L1 and the second light beam L2 passing through the second birefringent unit 121 does not change. However, the apparent optical path length through the birefringent unit 121A changes from DA0 to DA1. Similarly, the apparent optical path length through the birefringent unit 121B also changes. That is, the parameter d in the above equation (1) changes. As a result, when the target T is displaced in the Z-direction, the phase difference between the first light beam L1 and the second light beam L2 changes. In other words, when the target T is displaced by D in the Z-direction, in the second birefringent unit 121 as a whole, the apparent optical path length of the first light beam L1 and the second light beam L2 passing through the second birefringent unit 121 does not change. However, when the target T is displaced by D in the Z-direction, the optical path lengths of the first light beam L1 and the second light beam L2 within the second birefringent unit 121 change. Here, the optical path length is represented as the product of the apparent optical path length and the refractive index. As a result, the phase difference between the first light beam L1 and the second light beam L2 that have passed through the first birefringent unit 114 changes.

Figure 9:
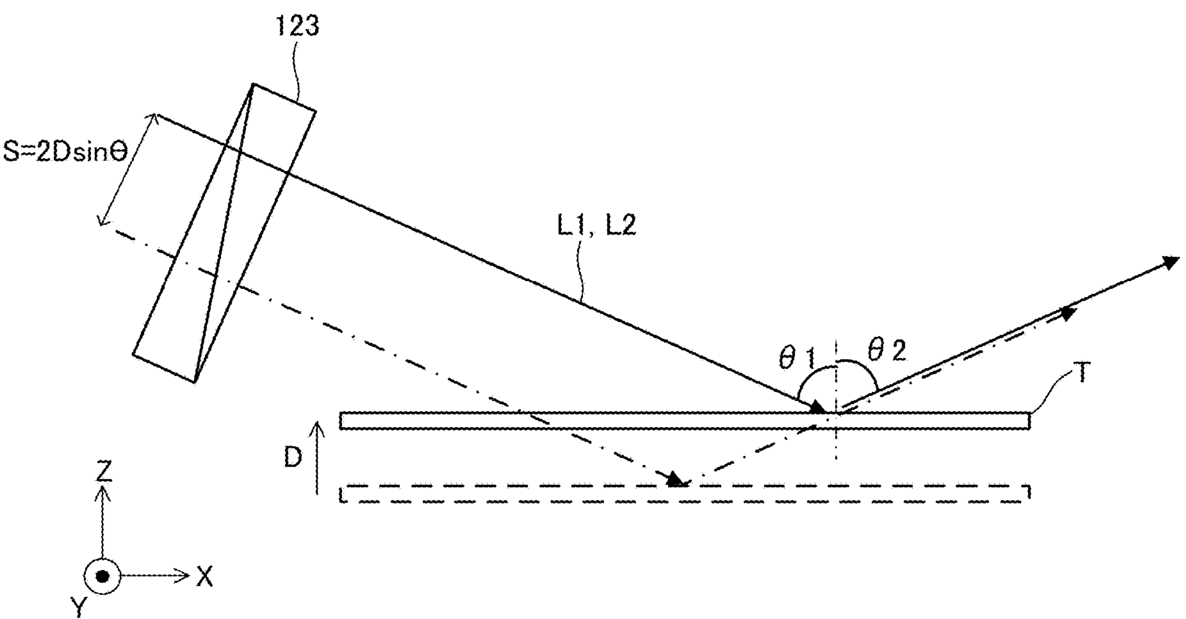
FIG. 9 is a diagram for explaining the phase change of light passing through the third birefringent unit when the target is displaced in the measurement direction.

FIG. 9 is a diagram for illustrating the phase change of light passing through the third birefringent unit when the target is displaced in the measurement direction. In the figure, the dashed line indicates the initial position of the target T, and the solid line indicates the target T displaced by D in the Z-direction from the initial position. As described above, when the target T is displaced by D in the Z-direction, the position of the light incident on the third birefringent unit 123 moves by a displacement amount S in a direction perpendicular to the incident light. The displacement amount S is expressed by equation (1) described above. The first light beam L1 and the second light beam L2 that have passed through the third birefringent unit are reflected by the target T again at the angle of incidence θ1 and the angle of reflection θ2, and then enter the fourth birefringent unit.

When the target T is displaced by D in the Z-direction, the positions at which the first light beam L1 and the second light beam L2 pass through the third birefringent unit 123 change. The third birefringent unit 123 is configured such that, in response to movement of the target T in the Z-direction (measurement direction), the optical path lengths of the first light beam L1 and the second light beam L2 in the third birefringent unit 123 change. As a result, the phase difference between the first light beam L1 and the second light beam L2 that have passed through the second birefringent unit 121 changes. In addition, the phase difference between the first light beam L1 and the second light beam L2 is changed not only by the second birefringent unit 121 but also by the third birefringent unit 123. In other words, the phase difference change resulting from passing through the third birefringent unit 123 is added to the phase difference between the first light beam L1 and the second light beam L2 that has changed due to passing through the second birefringent unit 121.

In addition, the first light beam L1 and the second light beam L2 that have passed through the third birefringent unit 123 are reflected at the target T at the same angle of incidence θ1 and the angle of reflection θ2 as the first light beam L1 and the second light beam L2 reflected at the target T after passing through the first birefringent unit 114. Therefore, even if the target T is displaced in the Z-direction, the first light beam L1 and the second light beam L2 that pass through the third birefringent unit 123 and are reflected by the target T travel to the fourth birefringent unit along the same optical path as when the target T is at the initial position. The first light beam L1 and the second light beam L2 that are incident on the fourth birefringent unit are photoelectrically converted by the displacement detection unit, and the displacement of the target T is measured.

Referring to FIG. 2, the displacement detection unit 13 includes a phase plate 132, a condenser lens 133, a beam splitter 134, polarizing beam splitters 135 and 136, and photodetectors 137A, 137B, 137C, and 137D.

The phase plate 132 receives the first light beam L1 and the second light beam L2 that have passed through the fourth birefringent unit 131. The phase plate 132 converts each of the first light beam L1 and the second light beam L2 into circularly polarized light. The first light beam L1 and the second light beam L2 are light beams having polarization axes orthogonal to each other. The first light beam L1 and the second light beam L2 that pass through the phase plate 132 become composite light consisting of circularly polarized light rotating in opposite directions. The composite light of the first light beam L1 and the second light beam L2 becomes linearly polarized light whose angle varies according to the phase change between the first light beam L1 and the second light beam L2.

The condenser lens 133 receives the composite light that has passed through the phase plate 132. The condenser lens 133 converts the received composite light into a plane wave. Since the condenser lens 133 can adjust the optical path, it is convenient if provided. However, the condenser lens 133 may be provided as necessary.

The beam splitter 134 receives the composite light that has passed through the condenser lens 133. The beam splitter 134 splits the received composite light into two beams. The beam splitter 134 is a non-polarizing beam splitter that does not depend on polarization.

The polarizing beam splitter 135 receives one of the beams split by the beam splitter 134. The polarizing beam splitter 136 receives the other beam split by the beam splitter 134. Each of the polarizing beam splitters 135 and 136 splits the received light into two beams. Each of the polarizing beam splitters 135 and 136 changes the polarization state of the received light. For example, each of the polarizing beam splitters 135 and 136 reflects the S component of the received light and transmits the P component. The polarizing beam splitter 136 is provided rotated by 45 degrees with respect to the polarizing beam splitter 135. That is, the polarizing beam splitter 136 is provided such that the photodetector 137C receives light that is 90 degrees out of phase with the light received by the photodetector 137A. The polarizing beam splitter 136 is provided such that the photodetector 137D receives light that is 90 degrees out of phase with the light received by the photodetector 137B.

The photodetector 137A receives one of the beams split by the polarizing beam splitter 135. The photodetector 137B receives the other beam split by the polarizing beam splitter 135. Each of the photodetectors 137A and 137B photoelectrically converts the received light. The photodetectors 137A and 137B are, for example, photodiodes. Each of the photodetectors 137A and 137B receives light whose light intensity varies depending on the angle of the linear polarization. Each of the photodetectors 137A and 137B outputs an electric signal corresponding to the received light intensity.

Similarly, the photodetector 137C receives one of the light beams split by the polarizing beam splitter 136. The photodetector 137D receives the other light beam split by the polarizing beam splitter 136. Each of the photodetectors 137C and 137D photoelectrically converts the received light. The photodetectors 137C and 137D are, for example, photodiodes. Each of the photodetectors 137C and 137D receives light whose light intensity varies according to the angle of the linearly polarized light. The photodetectors 137C and 137D each output an electrical signal corresponding to the light intensity they receive. Each of the photodetectors 137A, 137B, 137C, and 137D transmits the photoelectrically converted electrical signal to the displacement information output unit 14.

Figure 10:
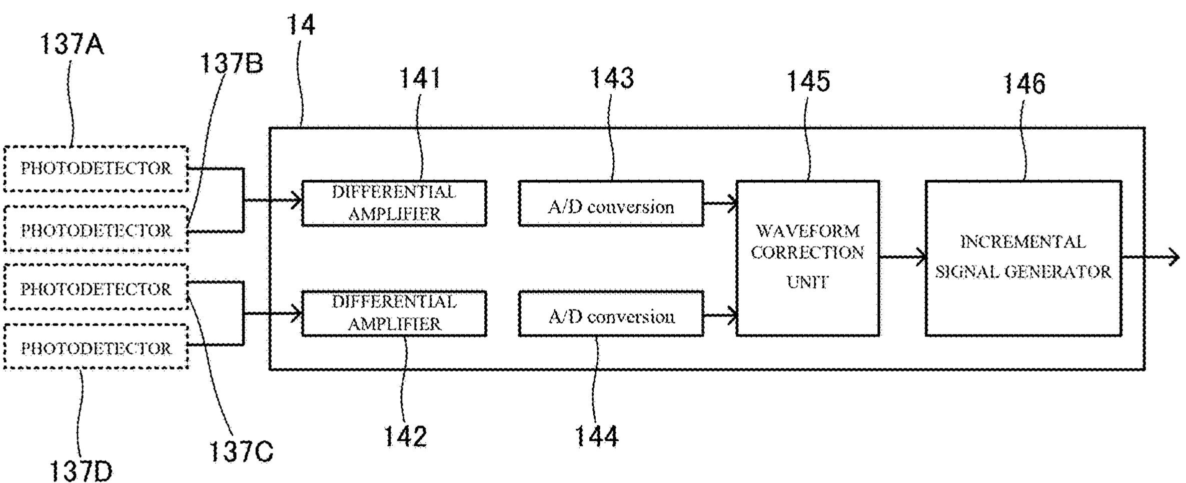
FIG. 10 is a functional block diagram of the displacement information output unit in the displacement detection apparatus according to the first embodiment.

FIG. 10 is a functional block diagram of the displacement information output unit in the displacement detection apparatus according to the first embodiment. The displacement information output unit 14 includes differential amplifiers 141 and 142, A/D conversion units 143 and 144, a waveform correction unit 145, and an incremental signal generator 146.

The differential amplifier 141 receives electrical signals output from photodetectors 137A and 137B. Here, the first light beam L1 and the second light beam L2 have different phases (a 180-degree phase shift). Therefore, based on the electrical signals output from the photodetectors 137A and 137B, the differential amplifier 141 outputs a displacement detection signal, which is a differential signal amplified with the DC component canceled. The displacement detection signal is output as phase A (first phase). The differential amplifier 141 transmits the displacement detection signal to the A/D conversion unit 143. By canceling the DC component in this manner, it is possible to cancel the influence of DC offset in the electrical signal caused by changes in the light intensity of the first light beam L1 and the second light beam L2.

Similarly, the differential amplifier 142 receives the electrical signals output by the photodetectors 137C and 137D. Based on the electrical signals output from the photodetectors 137C and 137D, the differential amplifier 142 outputs a displacement detection signal, which is a differential signal that is amplified and in which the DC component is canceled. This displacement detection signal is output as phase B (second phase). The differential amplifier 142 sends the displacement detection signal to the A/D conversion unit 144.

The displacement detection signals output from the differential amplifiers 141 and 142 are analog signals. The A/D conversion units 143 and 144 convert the displacement detection signals output from the differential amplifiers 141 and 142 into digital signals. In the present embodiment, the displacement detection signal output from the differential amplifier 141 is treated as a sin signal, and the displacement detection signal output from the differential amplifier 142 is treated as a cos signal. By using these two displacement detection signals (phase A and phase B) that differ in phase by 90 degrees, it is possible to determine whether the phase B displacement detection signal is leading or lagging with respect to the phase A displacement detection signal. That is, it is possible to determine whether the target T has been displaced in the +Z-direction or the −Z-direction. Each of the differential amplifiers 141 and 142 sends the converted digital signal to the waveform correction unit 145. Note that if direction detection is not required, the phase plate 132 may be omitted. That is, the displacement of the target may be measured based solely on the sin signal.

The waveform correction unit 145 performs appropriate correction of the DC component, gain, and phase of each received digital signal. The waveform correction unit 145 sends the corrected signals to the incremental signal generator 146. The incremental signal generator 146 accumulates the phase change amount per unit clock using a look-up table of the sin and cos signals, and outputs relative positional information. As a result, the displacement of the target T in the Z-direction is measured.

To illustrate, the difference in refractive index between the ordinary ray and extraordinary ray in a quartz plate, that is, the difference between n1 and n2, is generally about 0.0091.

For example, let the wavelength λ of the light emitted from the light source be 655 nm, the angle of incidence θ1 to the target T be 85 degrees, the displacement D of the target T in the Z-direction be 0.5 mm, and the incident positions S of the first light beam L1 and the second light beam L2 in the second birefringent unit 121 be shifted by 1 mm. The angle a at which the quartz plate is cut to produce a phase difference of one wavelength λ of the light source between the first light beam L1 and the second light beam L2 (i.e., the angle a for each birefringent unit: a1=a2=a3=a4=b1=b2=b3=b4) is determined by the following equation (3), and under the above conditions, a is calculated to be 1.03 degrees.

$$a = A\tan(\lambda / 4 \cdot S \cdot (n2 - n1)) \tag{3}$$

Therefore, when the target T moves by D=0.5 mm in the Z-direction, the phase of the signals detected by each photodetector 137A-137D of the displacement detection unit 13 completes one full cycle, resulting in a period of 0.5 mm. In the case of a period of 0.5 mm, the displacement detection apparatus of the present embodiment can detect the displacement of the target T in the Z-direction with a resolution of 7.6 nm.

As described above, in the displacement detection apparatus 1, the first light beam L1 and the second light beam L2, which are separated by the first birefringent unit 114, are superimposed by passing through the second birefringent unit 121, the third birefringent unit 123, and the fourth birefringent unit 131. Since the separation of the first light beam L1 and the second light beam L2 is suppressed, even if the distance between the displacement detection unit 13 and the target T is long, the displacement detection unit 13 can receive both the first light beam L1 and the second light beam L2. Even if the projection optical apparatus 100 is provided above the target T, it is possible to measure the displacement of the target T in the Z-direction from various positions.

In general, in displacement detection apparatuses that use optical interference, the reference light is fixed and the object light is directed to the target. Therefore, if the surface of the target is tilted, the object light reflected by the target tends to be deflected. In this case, interference fringes are likely to be generated in the interference light formed on the surface of the photodetector, with a pitch of $d=\lambda/\sin\theta$. Here, $\lambda$ is the wavelength of the light source, and $\theta$ is the angular deviation of the object light reflected from the target. On the other hand, the optical axis of the reference light remains fixed and does not change even if the target is tilted. That is, if interference fringes with a finer pitch than the effective dimension of the photodetector are generated, the contrast between light and dark in the photoelectrically converted interference signal will decrease, making the signal output likely to drop. In contrast, in the displacement detection apparatus 1 of the first embodiment, both the first light beam L1 and the second light beam L2 that have passed through the first birefringent unit 114, are reflected by the same target T. As a result, any relative angular variation between the first light beam L1 and the second light beam L2 is suppressed before they enter the second birefringent unit 121 after exiting the first birefringent unit 114. Therefore, even if the target T is tilted, the displacement of the target T in the Z-direction can be measured without being affected by the tilt. In other words, issues common to displacement detection apparatuses that use optical interference are less likely to occur. Accordingly, the displacement detection apparatus 1 enables high measurement accuracy while also improving versatility.

Furthermore, in the displacement detection apparatus 1, the first birefringent unit 114 is formed by bonding two birefringent units 114A and 114B. Therefore, compared to a configuration in which the first birefringent unit 114 consists of a single birefringent unit, the phase difference imparted between the first light beam L1 and the second light beam L2 as they pass through the first birefringent unit 114 tends to be greater. This increases the resolution of displacement measurement for the target T.

Furthermore, in the displacement detection apparatus 1, the first light beam L1 and the second light beam L2 that pass through the third birefringent unit 123 and are reflected by the target T follow the same optical path regardless of the Z-direction position of the target T. In other words, the first light beam L1 and the second light beam L2 reflected by the target T return to their original optical path. As a result, the optical axes of the first light beam L1 and the second light beam L2 directed to the fourth birefringent unit can be kept constant without depending on the movement of the target T in the Z-direction. As a result, even if the target T moves in the Z-direction, there is no need to change the position of the displacement detection unit.

Furthermore, in the displacement detection apparatus 1, it is possible to suppress the phenomenon in which the first light beam and the second light beam returning to the displacement detection unit are separated due to the difference in refractive index for polarization components caused by each birefringent unit. Therefore, in order to improve the resolution in the displacement detection apparatus 1, it is only necessary to increase the cutting angle of the quartz plates constituting each birefringent unit.

<Variation>

Figure 11:
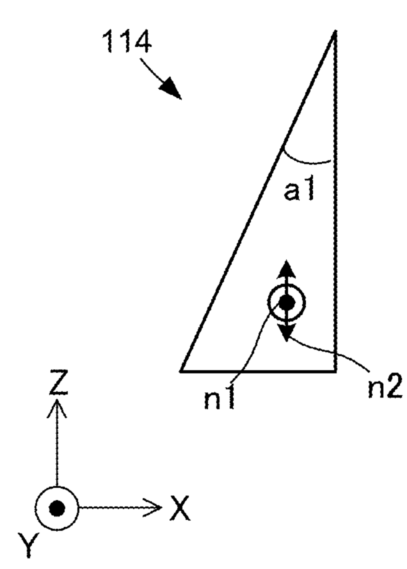
FIG. 11 is a diagram showing the configuration of the first to fourth birefringent units according to a variation of the first embodiment.
Figure 11:
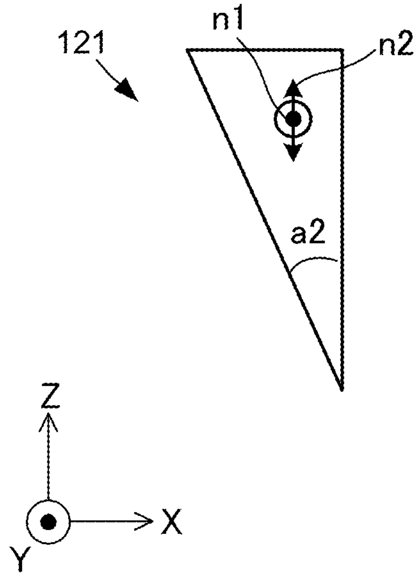
Figure 11:
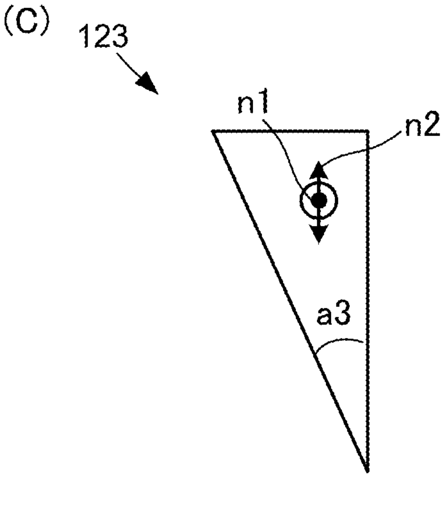
Figure 11:
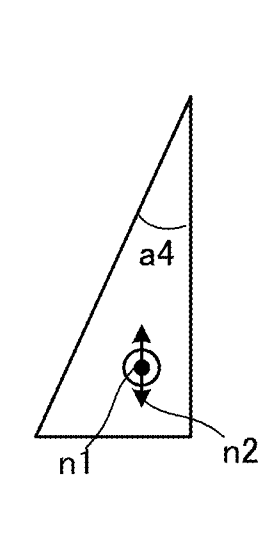
Figure 11:
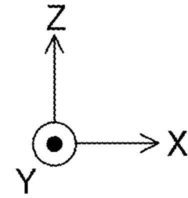
Figure 11:
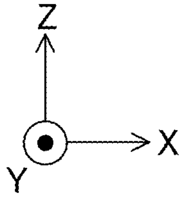

FIG. 11 is a diagram showing the configuration of the first to fourth birefringent units according to a variation of the first embodiment. In the embodiment described above, each of the first to fourth birefringent units is formed by bonding two birefringent units. However, each of the first to fourth birefringent units may instead be formed of a single birefringent unit having a triangular shape.

Referring to FIG. 11(A), the first birefringent unit 114 is composed of a single birefringent unit having an angle a1. The refractive index of the first birefringent unit 114 is n1 in the Y direction and n2 in the Z-direction. Referring to FIG. 11(B), the second birefringent unit 121 is composed of a birefringent unit having an angle a2. The second birefringent unit 121 has a crystal axis orthogonal to that of the first birefringent unit 114. That is, the refractive index of the second birefringent unit 121 is n2 in the Y direction and n1 in the Z-direction. Referring to FIG. 11(C), the third birefringent unit 123 is composed of a birefringent unit having an angle a3. The refractive index of the third birefringent unit 123 is n2 in the Y direction and n1 in the Z-direction. Referring to FIG. 11(D), the fourth birefringent unit 131 is composed of a birefringent unit having an angle a4. The fourth birefringent unit 131 has a crystal axis orthogonal to the third birefringent unit 123. That is, the refractive index of the fourth birefringent unit 131 is n1 in the Y direction and n2 in the Z-direction.

Figure 12:
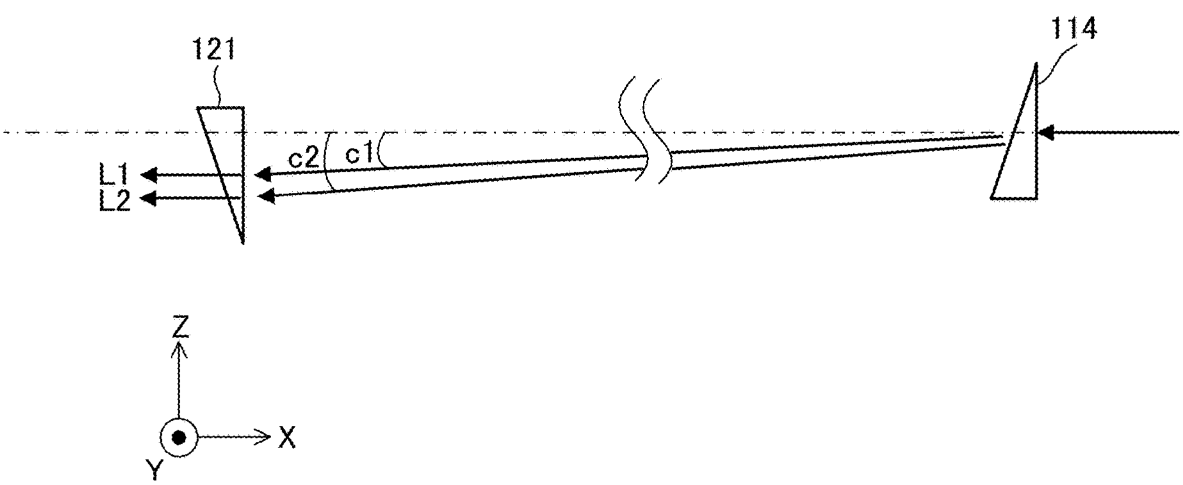
FIG. 12 is a diagram showing the change in the optical axis of light passing through the first birefringent unit and the second birefringent unit according to a variation of the first embodiment.

FIG. 12 is a diagram showing the change in optical axis of light passing through the first birefringent unit and the second birefringent unit according to the variation of the first embodiment. The first birefringent unit 114 splits incident light into a first light beam L1 and a second light beam L2. Since the first birefringent unit 114 is composed of a single birefringent unit, the first light beam L1 and the second light beam L2 are refracted to the same side with respect to the optical axis of the incident light. The first light beam L1 and the second light beam L2 are reflected by the target (not shown) and then enter the second birefringent unit 121. The optical axes of the first light beam L1 and the second light beam L2 that have passed through the second birefringent unit 121 become parallel to the optical axis before entering the first birefringent unit 114. The first light beam L1 and the second light beam L2 that have passed through the second birefringent unit 121 are incident on the third birefringent unit 123 via a reflective member.

Figure 13:
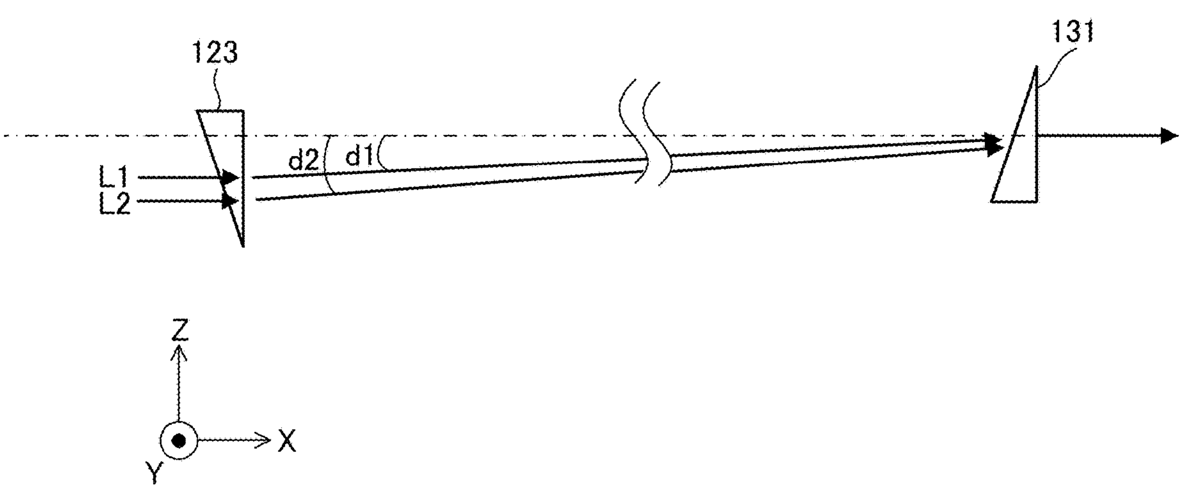
FIG. 13 is a diagram showing the change in the optical axis of light passing through the third birefringent unit and the fourth birefringent unit according to a variation of the first embodiment.

FIG. 13 is a diagram showing the change in optical axis of light passing through the third birefringent unit and the fourth birefringent unit according to the variation of the first embodiment. The third birefringent unit 123 converges the first light beam L1 and the second light beam L2. The first light beam L1 and the second light beam L2 that have passed through the birefringent unit 123 are reflected by the target (not shown) and enter the fourth birefringent unit 131. The optical axes of the first light beam L1 and the second light beam L2 that have passed through the fourth birefringent unit 131 become parallel to the optical axes before entering the third birefringent unit 123 and are superimposed.

According to a displacement detection apparatus having such a configuration, the number of members constituting the first to fourth birefringent units can be reduced, thereby simplifying the structure and reducing costs.

<Other Applications>

In the above-described first embodiment and its variation, the displacement detection apparatus measures the displacement of the target T in the Z-direction. In addition to this displacement detection apparatus, a scale and an encoder may be added to measure not only the displacement of the target T in the Z-direction but also the displacements in the X and Y directions.

Figure 14:
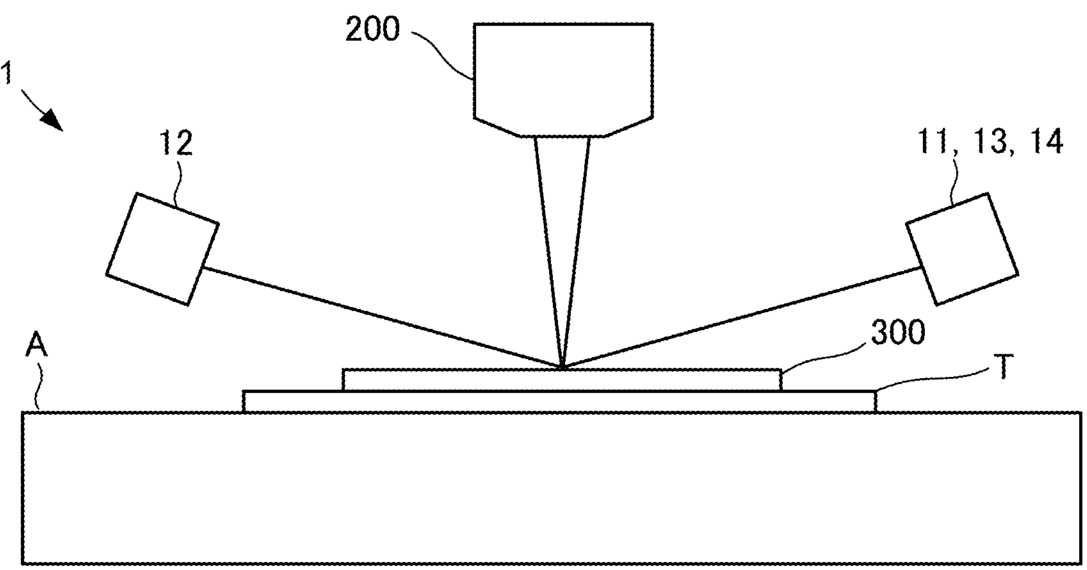
FIG. 14 is a schematic diagram showing another example application of the displacement detection apparatus according to the first embodiment.
Figure 14:
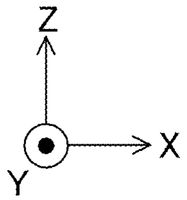

FIG. 14 is a schematic diagram showing another example application of the displacement detection apparatus of the first embodiment. The displacement measurement system includes a displacement detection apparatus 1, an encoder 200, and a scale 300. The displacement measurement system is a three-dimensional measurement system that measures displacements of the target T in the X, Y, and Z-directions.

The displacement detection apparatus 1 is the same as the displacement detection apparatus of the first embodiment described above. However, the displacement detection apparatus 1 may be the displacement detection apparatus according to the variation of the first embodiment, or may be the displacement detection apparatus of another embodiment described later. The displacement detection apparatus 1 measures the displacement of the target T in the Z-direction by measuring the displacement in the Z-direction of the surface of the scale 300 in the vicinity of the detection position of the encoder 200.

The encoder 200 is provided above the target T. The encoder 200 may be a one-dimensional linear encoder or a two-dimensional linear encoder. The scale 300 is a planar scale. The scale 300 may be a one-dimensional linear scale or a two-dimensional linear scale. The scale 300 is provided such that at least a part of it is located on the surface of the target T.

Figure 15:
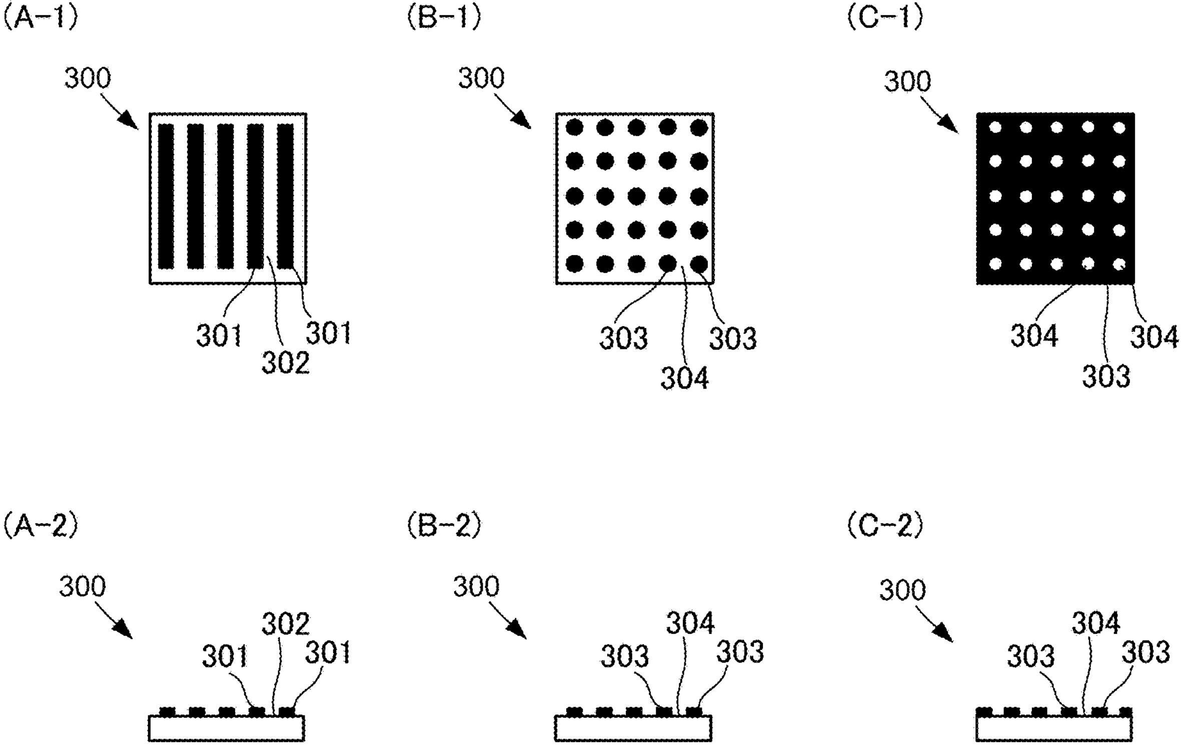
FIG. 15 is a diagram showing an example configuration of the scale in another example application of the displacement detection apparatus according to the first embodiment.

FIG. 15 is a diagram showing an example configuration of a scale in another example application of the displacement detection apparatus of the first embodiment. In the figure, (A-1) and (A-2) indicate a one-dimensional scale, (B-1) and (B-2) indicate a two-dimensional scale, and (C-1) and (C-2) indicate a two-dimensional scale different from (B-1) and (B-2).

First, the one-dimensional scale will be described. (A-1) is a front view, that is, a view in the Z-direction, and (A-2) is a side view, that is, a view in the Y direction. The one-dimensional scale is a grating scale having a grating vector in one direction (a direction contained in the X-Y plane). On the surface of the grating, protrusions 301 are formed at regular pitches. Depressions 302 are formed between adjacent protrusions 301. A reflective material is applied to the surfaces of the depressions 302 and protrusions 301, that is, the surface of the grating.

Next, the two-dimensional scale will be described. (B-1) is a front view, and (B-2) is a side view. The two-dimensional scale is a grating scale having grating vectors in two directions (a direction contained in the X-Y plane). On the surface of the grating, protrusions 303 are formed in two orthogonal directions (vertical and horizontal on the paper) at regular pitches. The protrusions 303 have a dot shape. Depressions 304 are formed between adjacent protrusions 303. A reflective material is applied to the surface of the grating. Note that the positions of the protrusions 303 and depressions 304 may be reversed. A two-dimensional scale having such a configuration is shown in (C-1) and (C-2) in the figure.

Referring to FIG. 14, the encoder 200 emits light onto the scale 300 and measures displacement in the X and/or Y directions of the scale 300, that is, displacement in the X and/or Y directions of the target T. When a one-dimensional scale is used, the measurement system can detect displacement in two directions, X and Z. When a two-dimensional scale is used, it can detect displacement in three directions, X, Y, and Z. The encoder 200 may be of the moiré type, which emits light onto a grating scale and detects displacement using moiré fringes obtained from the grating scale, or of the grating interference type, which detects displacement using diffracted light.

Figure 16:
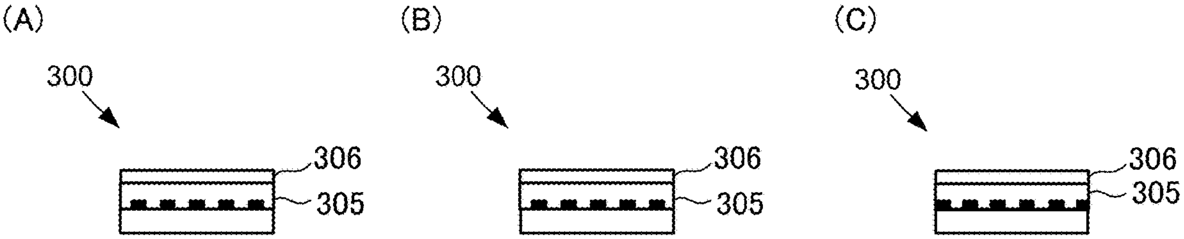
FIG. 16 is a diagram showing another example configuration of the scale in another example application of the displacement detection apparatus of the first embodiment.

FIG. 16 is a diagram showing another example configuration of a scale in another example application of the displacement detection apparatus of the first embodiment. In the figure, (A) shows a one-dimensional scale, (B) shows a two-dimensional scale, and (C) shows a two-dimensional scale in which the protrusions and depressions are reversed compared to (B). The scale 300 may have a protective layer 305 on top of the grating scale. The scale 300 may also have a reflective film 306 provided on the surface of the protective layer 305 that reflects only specific wavelengths of light. The encoder 200 may emit light onto the grating scale and measure displacement in the X and/or Y directions, while the displacement detection apparatus 1 may emit light onto the reflective film 306 provided on the surface of the protective layer 305 to measure displacement in the Z-direction (the gap between the scale and the displacement detection apparatus). Also, referring to FIG. 14, the illumination unit 11, the displacement detection unit 13, and the light reflection unit 12 of the displacement detection apparatus 1 may be disposed on a movable stage A, and the relative gap with respect to a fixed scale or mirror may be measured. The installation positions of the illumination unit 11, the displacement detection unit 13, and the light reflection unit 12 of the displacement detection apparatus 1 are not limited to those described above.

Second Embodiment

Figure 17:
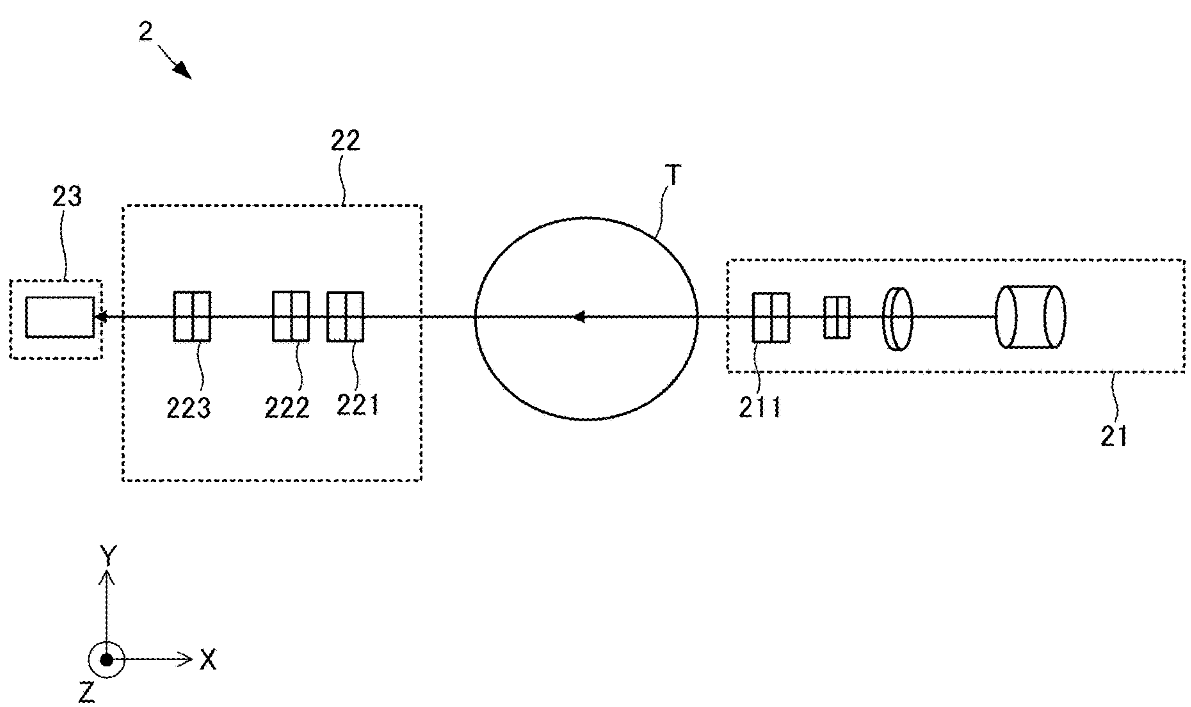
FIG. 17 is a front view showing the configuration of the displacement detection apparatus of the second embodiment.

FIG. 17 is a front view showing the configuration of the displacement detection apparatus of the second embodiment. In the displacement detection apparatus of the first embodiment, light is reflected twice by the target. In contrast, in the displacement detection apparatus of the second embodiment, light is reflected once by the target.

The displacement detection apparatus 2 includes an illumination unit 21 and a displacement detection unit 22. Unlike the displacement detection apparatus of the first embodiment, the displacement detection apparatus 2 does not include a light reflection unit. The illumination unit 21 is the same as that in the displacement detection apparatus of the first embodiment. The displacement detection unit 22 includes a second birefringent unit 221, a third birefringent unit 222, and a fourth birefringent unit 223. The first light beam and the second light beam that have passed through the first birefringent unit 211 are reflected by the target T and enter the second birefringent unit 221. The first light beam and the second light beam that have passed through the second birefringent unit 221 enter the third birefringent unit 222 without being reflected by the target T. Likewise, the first light beam and the second light beam that have passed through the third birefringent unit 222 enter the fourth birefringent unit 223 without being reflected by the target T. In summary, the first light beam and the second light beam that have passed through the first birefringent unit 211 and are reflected by the target T proceed through the third birefringent unit and the fourth birefringent unit 222 and 223 without being folded back. Other components of the displacement detection apparatus 2 are the same as those of the displacement detection apparatus of the first embodiment.

As described above, the displacement detection apparatus 2 of the second embodiment measures the displacement of the target T in the Z-direction by reflecting light once off the target T. Such a configuration is effective, for example, when the reflectance of the target T is low. Furthermore, since the light is reflected only once by the target T, the displacement of the target T can be measured with pinpoint accuracy. Furthermore, since the first light beam and the second light beam are reflected only once by the target T, the optical axes of the first light beam and the second light beam also shift due to the movement of the target in the Z-direction. As a result, the incident position of light in the fourth birefringent unit 223 also moves (i.e., the optical axis shifts). Therefore, the phase changes of the first light beam and the second light beam caused by the shift in the optical axis within the third birefringent unit 222 and the fourth birefringent unit 223 cancel each other out. Accordingly, only the phase change of the first light beam and the second light beam caused by the shift in the optical axis within the second birefringent unit 221 is detected as the displacement of the target T in the Z-direction. Additionally, in the displacement detection apparatus 2, although not shown, a condenser lens (see reference character 133 in FIG. 2) that converges the first light beam and the second light beam that have passed through the fourth birefringent unit 223 functions effectively. The condenser lens converges the light beams onto each of the four photodetectors. Therefore, even if the Z-direction movement of the target T causes a shift in the optical axes of the first light beam and the second light beam, which are superimposed in the fourth birefringent unit 223, the optical axes remain almost stationary at the positions of the respective photodetectors, allowing each photodetector to stably output signals to the displacement information output unit 23.

It should be noted that, in the displacement detection apparatus 2 of the second embodiment as well, each birefringent unit may be configured as a single birefringent unit, as described in the variation of the first embodiment.

Third Embodiment

Figure 18:
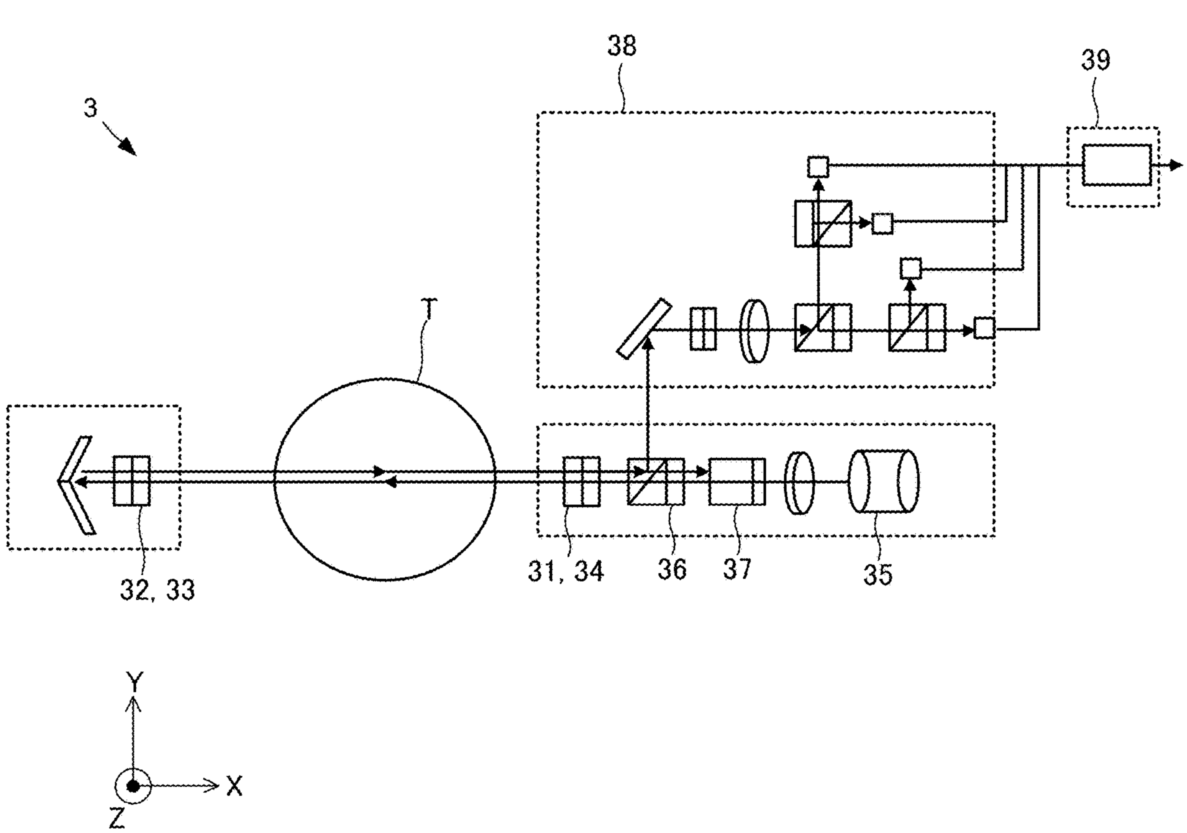
FIG. 18 is a front view showing the configuration of the displacement detection apparatus of the third embodiment.

FIG. 18 is a front view showing the configuration of the displacement detection apparatus of the third embodiment. In the displacement detection apparatus of the first embodiment, the positions where light is reflected twice on the target are different. In contrast, in the displacement detection apparatus of the third embodiment, the positions where light is reflected twice on the target are the same, and the optical paths of the forward and return routes coincide.

In the displacement detection apparatus 3, the first birefringent unit 31 and the fourth birefringent unit 34 are composed of the same member. That is, a single member functions as the first birefringent unit 31 when it splits the light emitted from the light source, and as the fourth birefringent unit 34 when it receives light that has passed through the third birefringent unit 33. Similarly, the second birefringent unit 32 and the third birefringent unit 33 are also composed of the same member. That is, a single member functions as the second birefringent unit 32 when receiving light that has passed through the first birefringent unit 31, and as the third birefringent unit 33 when receiving light that has passed through the second birefringent unit 32.

In the displacement detection apparatus 3, a beam splitter 36 and an isolator 37 are provided between the light source 35 and the first birefringent unit 31. The beam unit 36 splits the return-path light and directs it to the displacement detection unit 38. The isolator 37 is provided to prevent part of the return-path light from returning to the light source 35. The output signal from the displacement detection unit 38 is transmitted to the displacement information output unit 39.

With the configuration of the displacement detection apparatus 3 of the third embodiment, the position on the target T where light is emitted is concentrated into a single point. Accordingly, the displacement of the target T can be measured with pinpoint accuracy. It should be noted that, in the displacement detection apparatus 3 of the third embodiment as well, each birefringent unit may be configured as a single birefringent unit, as described in the variation of the first embodiment.

Fourth Embodiment

Figure 19:
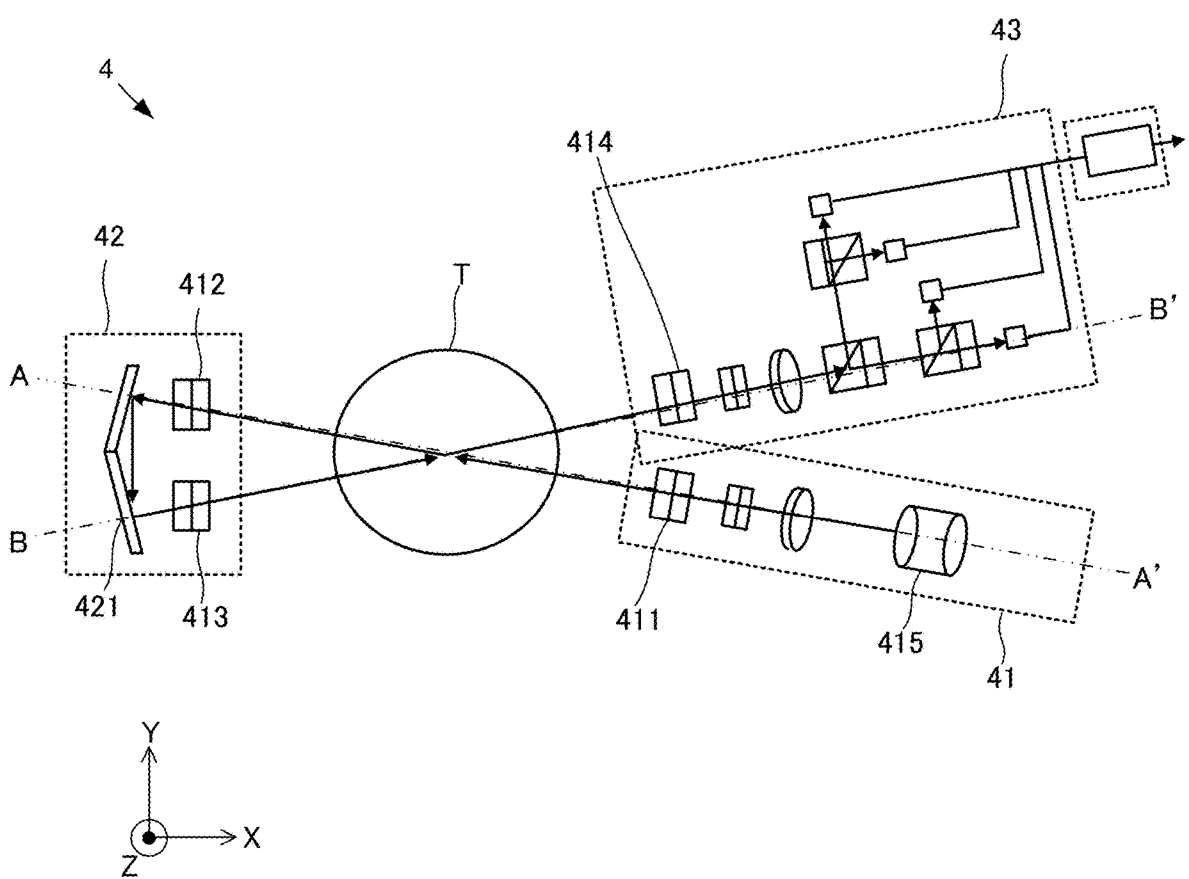
FIG. 19 is a front view showing the configuration of the displacement detection apparatus of the fourth embodiment.

FIG. 19 is a front view showing the configuration of the displacement detection apparatus of the fourth embodiment. In the displacement detection apparatus of the third embodiment, the two positions where light is reflected on the target are the same, and the forward and return optical paths coincide. In contrast, in the displacement detection apparatus of the fourth embodiment, while the two positions of reflection on the target are the same, the forward and return optical paths differ.

In the displacement detection apparatus 4, when viewed along the Z-direction, the optical axis of the light traveling from the first birefringent unit 411 to the second birefringent unit 412 (the forward optical axis) A-A' and the optical axis of the light traveling from the third birefringent unit 413 to the fourth birefringent unit 414 (the return optical axis) B-B' intersect at a predetermined angle. In other words, the forward optical axis A-A' and the return optical axis B-B' are not parallel. Furthermore, the forward optical axis A-A' and the return optical axis B-B' intersect on the target T. The angle formed between the forward optical axis A-A' and the return optical axis B-B' is appropriately set by adjusting the angle of reflection of the reflective member 421.

With the configuration of the displacement detection apparatus 4 of the fourth embodiment, the position on the target T where light is emitted is concentrated into a single point. Accordingly, the displacement of the target T can be measured with pinpoint accuracy. In addition, since the forward optical axis A-A' and the return optical axis B-B' do not overlap in parallel, the illumination unit 41 and the displacement detection unit 43 can be spatially separated. Accordingly, since there is no need for countermeasures against return light to the light source 415, components such as the isolator 37 described in the third embodiment can be omitted, simplifying the configuration of the displacement detection apparatus and reducing costs. Furthermore, spatially separating the illumination unit 41 and the displacement detection unit 43 facilitates the layout and manufacturing of the displacement detection apparatus 4. It should be noted that, in the displacement detection apparatus 4 of the fourth embodiment as well, each birefringent unit may be configured as a single birefringent unit, as described in the variation of the first embodiment.

In the example shown in FIG. 19, the illumination unit 41 and the displacement detection unit 43 are each angled so that the forward optical axis A-A' and the return optical axis B-B' intersect. However, a way to cause the forward optical axis A-A' and the return optical axis B-B' to intersect is not limited to this configuration.

Figure 20:
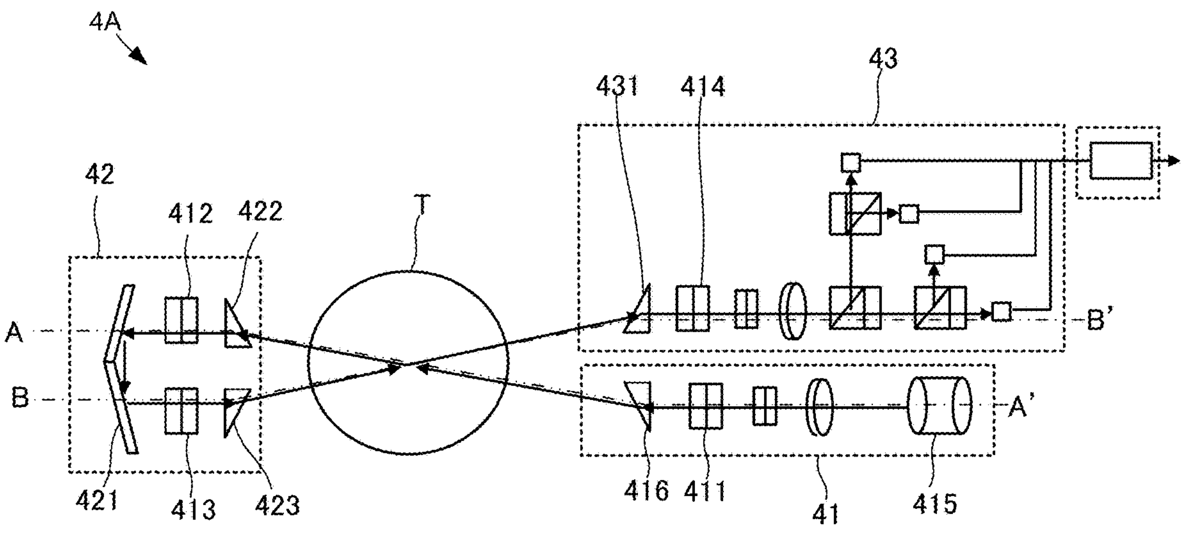
FIG. 20 is a front view showing the configuration of the displacement detection apparatus according to a variation of the fourth embodiment.
Figure 20:
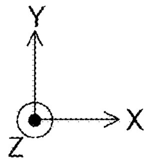

FIG. 20 is a front view showing the configuration of a displacement detection apparatus according to a variation of the fourth embodiment. In the displacement detection apparatus 4A shown in this example, the illumination unit 41, the light reflection unit 42, and the displacement detection unit 43 each include an inclination unit, which differs from the example shown in FIG. 19.

The illumination unit 41 includes an inclination unit 416 that refracts the light emitted from the light source 415. The inclination unit 416 is provided downstream of the first birefringent unit 411 along the optical path in the illumination unit 41. The inclination unit 416 is provided between the first birefringent unit 411 and the target T along the optical path.

The light reflection unit 42 includes an inclination unit 422 and an inclination unit 423. The inclination unit 422 refracts the light that is reflected by the target T and directed toward the second birefringent unit 412. The inclination unit 422 is provided upstream of the second birefringent unit 412 along the optical path in the light reflection unit 42. The inclination unit 422 is provided between the target T and the second birefringent unit 412 along the optical path. The inclination unit 423 refracts the light that passes through the third birefringent unit 413 and is directed toward the target T. The inclination unit 423 is provided downstream of the third birefringent unit 413 along the optical path in the light reflection unit 42. The inclination unit 423 is provided between the third birefringent unit 413 and the target T along the optical path.

The displacement detection unit 43 includes an inclination unit 431 that refracts the light reflected by the target T and directed toward the fourth birefringent unit 414. The inclination unit 431 is provided upstream of the fourth birefringent unit 414 along the optical path in the displacement detection unit 43. The inclination unit 431 is provided between the target T and the fourth birefringent unit 414 along the optical path.

In this way, even in a configuration where neither the illumination unit 41 nor the displacement detection unit 43 is tilted, and the forward optical axis A-A' and the return optical axis B-B' are parallel, the forward and return optical axes can be made to intersect by providing the inclination units 416, 422, 423, and 431. With the displacement detection apparatus 4A according to such a variation, the optical path can be designed independently of the orientation of components such as the illumination unit 41, making it easier to lay out and manufacture the displacement detection apparatus 4. The inclination units 416, 422, 423, and 431 are implemented using optical components such as triangular prisms or mirrors. It is preferable for the inclination units 416, 422, 423, and 431 to have the same refractive index (i.e., angle of inclination of the light), but they may differ. Additionally, the number of inclination unit is not limited to four. The inclination units only need to be arranged such that the forward optical axis A-A' and the return optical axis B-B' intersect, and the positions and number of the inclination units are not limited to the examples shown in the figure.

Fifth Embodiment

Figure 21:
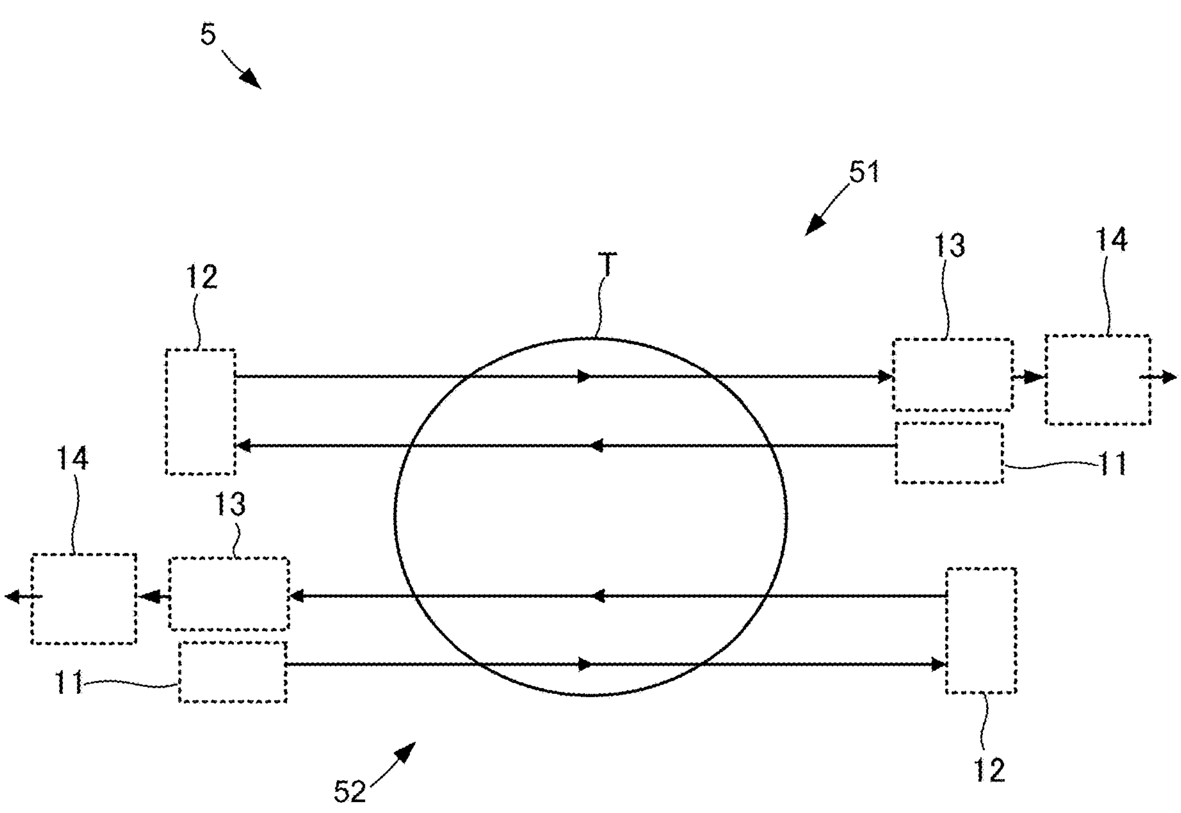
FIG. 21 is a front view showing the configuration of the displacement detection apparatus of the fifth embodiment.
Figure 21:
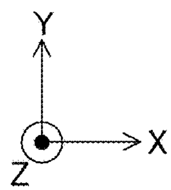

FIG. 21 is a front view showing the configuration of a displacement detection apparatus of the fifth embodiment. In the displacement detection apparatus of the first embodiment, a single displacement detection apparatus measures displacement of the target in the Z-direction. In contrast, in the displacement detection apparatus of the fifth embodiment, two displacement detection apparatuses arranged facing each other measure the displacement of the target in the Z-direction. These two displacement detection apparatuses are configured to cancel out displacement errors that may occur when the target tilts around the Y-axis.

The displacement detection apparatus 5 includes a main displacement detection apparatus 51 and a sub displacement detection apparatus 52. Both the main displacement detection apparatus 51 and the sub displacement detection apparatus 52 share the same configuration as the displacement detection apparatus 1 of the first embodiment. However, the main displacement detection apparatus 51 and the sub displacement detection apparatus 52 may also adopt the same configuration as the displacement detection apparatuses of the second through fourth embodiments. The main displacement detection apparatus 51 and the sub displacement detection apparatus 52 are arranged point-symmetrically about the center of the target T. The main displacement detection apparatus 51 is provided so that light is reflected from a region on the +Y side of the target's center. The sub displacement detection apparatus 52 is provided so that light is reflected from a region on the −Y side of the center of the target T.

Figure 22:
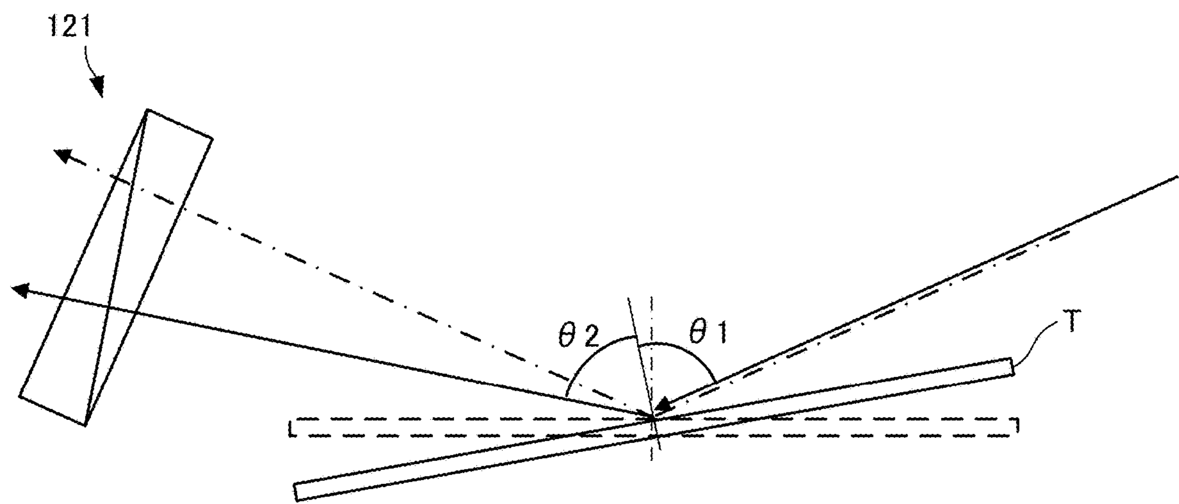
FIG. 22 is a diagram showing the change in the optical path when the target is tilted around the Y-axis.
Figure 22:
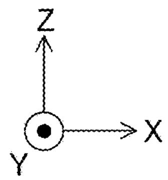

FIG. 22 is a diagram showing changes in the optical path when the target is tilted around the Y-axis. As indicated by the dashed line in the figure, suppose the target T, which was originally horizontal, becomes tilted around the Y-axis as shown by the solid line. In this case, the angle of incidence θ1 and the angle of reflection θ2 of the light emitted from the illumination unit change. As a result, the position at which the reflected light passes through the second birefringent unit 121 differs, causing a change in the phase of the light. This may lead the displacement detection apparatus to erroneously detect a Z-direction displacement of the target T, even though no such displacement has occurred, i.e., a measurement error may occur.

Referring to FIG. 21, in the displacement detection apparatus of the fifth embodiment, a sub displacement detection apparatus 52 is provided to cancel out the measurement error of the main displacement detection apparatus 51. More specifically, when the target T tilts around the Y-axis, the phase of the light emitted from the main displacement detection apparatus 51 changes. On the other hand, the phase of the light emitted from the sub displacement detection apparatus 52 also changes, in the same manner as that from the main displacement detection apparatus 51, when the target T tilts around the Y-axis. However, the sub displacement detection apparatus 52 is configured such that the phase change of the light it emits occurs in the opposite direction to the phase change of the light emitted from the main displacement detection apparatus. Therefore, although the phases of the light from the main displacement detection apparatus 51 and the sub displacement detection apparatus 52 change, their phase changes cancel each other out when summed. In other words, the tilt of the target T can be canceled. Additionally, the displacement detection apparatus can also detect only the tilt of the target T by calculating the difference between the phase changes of the light from the main displacement detection apparatus 51 and the sub displacement detection apparatus 52. In this way, with the displacement detection apparatus 5 of the fifth embodiment, by measuring the Z-direction displacement of the target T based on the displacement information from the main displacement detection apparatus 51 and the sub displacement detection apparatus 52, it is possible to suppress Z-direction measurement errors that may occur when the target T tilts around the Y-axis. It should be noted that, in the displacement detection apparatus 5 of the fifth embodiment as well, each birefringent unit may be configured as a single birefringent unit, as described in the variation of the first embodiment.

Sixth Embodiment

Figure 23:
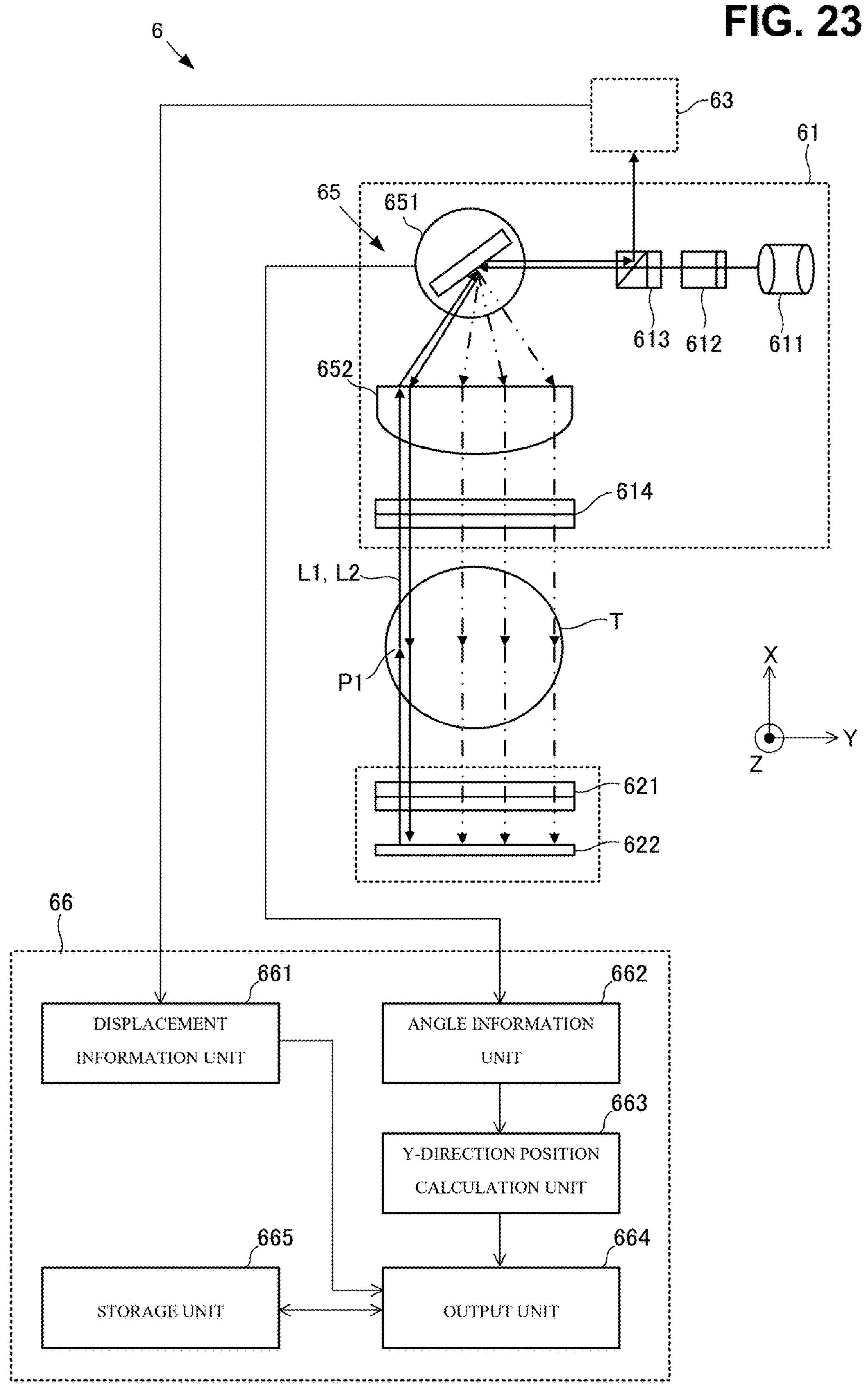
FIG. 23 is a front view showing the configuration of the displacement detection apparatus of the sixth embodiment.

FIG. 23 is a front view showing the configuration of a displacement detection apparatus of the sixth embodiment. The displacement detection apparatus 6 of the sixth embodiment differs from the above-described embodiments in that it includes a scanning mechanism 65 capable of changing the reflection position of light on the target, and a displacement information output unit 66. Although the scanning mechanism 65 can be applied to all of the previously described embodiments, the explanation here will be based on the displacement detection apparatus of the third embodiment as an example.

First, the configuration of the scanning mechanism 65 will be described. The scanning mechanism 65 is included in the illumination unit 61. The scanning mechanism 65 is provided between the light source 611 and the first birefringent unit 614 along the optical path. The scanning mechanism 65 scans the surface of the target T using light from the light source 611. More specifically, the scanning mechanism 65 includes a light scanning unit 651 and a lens 652.

The light scanning unit 651 is provided between the light source 611 and the lens 652 along the optical path. The light scanning unit 651 may include, for example, a polygon mirror, a drive device for rotating the polygon mirror, and a rotary encoder for detecting the rotation angle of the polygon mirror. It should be noted that the light scanning unit 651 is not limited to a configuration including a polygon mirror. The light scanning unit 651 may also include other components such as a galvanometer mirror or a MEMS mirror (Micro Electro Mechanical Systems Mirror). The lens 652 is provided between the light scanning unit 651 and the first birefringent unit 614 along the optical path. The lens 652 is, for example, a collimator lens.

Next, the change in the reflection position of the light on the target T by the scanning mechanism 65 will be described. The light emitted from the light source 611 passes through the polarizer 612 and the beam splitter 613, reaching the light scanning unit 651. The light scanning unit 651 reflects the light received from the light source 611 in various directions. The light scanning unit 651 varies the angle of reflection of the light from the light source 611. In this example, light from the light source 611 is directed onto a polygon mirror, which is rotated by a drive device, causing the light to be reflected in various directions. The scanning mechanism 65 enables the optical path incident on the lens 652 to be moved in the Y direction. The light reflected by the light scanning unit 651 is then incident on the lens 652.

The lens 652 aligns the incident light in parallel along the X direction. As a result, even if the incident position on the lens 652 changes due to the light scanning unit 651, the light that passes through the lens 652 becomes parallel in the X direction. The light that has passed through the lens 652 is then incident on the first birefringent unit 614. Since the optical path after the light enters the first birefringent unit 614 is the same as that in the third embodiment, only a brief explanation will follow.

The light (the first light beam L1 and the second light beam L2) that have passed through the first birefringent unit 614 is reflected by the target T. The first light beam L1 and the second light beam L2 reflected by the target T then pass through the second birefringent unit 621. At this time, if the target T has been displaced in the Z-direction, the positions at which the first light beam L1 and the second light beam L2 reflected by the target T enter the second birefringent unit 621 will differ from the positions before the target T was displaced. In the birefringent unit, the phase difference between polarization components varies depending on the incident position. The first light beam L1 and the second light beam L2, which carry this phase difference, are reflected by the reflecting unit 622. The first light beam L1 and the second light beam L2 reflected by the reflecting unit 622 then return along the same path as in the forward direction. The first light beam L1 and the second light beam L2 are reflected by the beam splitter 613 and reach the displacement detection unit 63. The processing performed in the displacement detection unit 63 is the same as in the previously described embodiments and is therefore omitted here.

Next, the displacement information output unit 66 will be described. The displacement information output unit 66 links the reflection position of the light, which is moved by the scanning mechanism 65, with the displacement of the target T that is calculated. To realize this function, the displacement information output unit 66 includes the following functional units.

The displacement information output unit 66 includes a displacement information unit 661 that acquires the displacement of the target in the measurement direction, as calculated by the displacement detection unit 63. As an illustrative example, the optical path indicated by the solid line in the figure can be considered. In this case, the reflection position of the first light beam L1 and the second light beam L2 on the target T is at position P1. The displacement detection unit 63 calculates the Z-direction displacement of the target T at position P1. The displacement detection unit 63 sends the displacement information of the target T at position P1 to the displacement information unit 661. The displacement information unit 661 sends the obtained displacement information to the output unit 664. Additionally, the scanning mechanism 65 sends the rotation angle information of the polygon mirror, which corresponds to the optical path shown by the solid line taken by the first light beam L1 and the second light beam L2, to the displacement information output unit 66 (the angle information unit 662).

The angle information unit 662 is connected to the rotary encoder of the scanning mechanism 65. The angle information unit 662 acquires the rotation angle of the polygon mirror based on signals from the rotary encoder. In other words, the angle information unit 662 acquires the information necessary to identify the optical path moved by the scanning mechanism 65. The angle information unit 662 sends the obtained information to a Y-direction position calculation unit 663.

The Y-direction position calculation unit 663 calculates the Y-direction positional information of the reflection point P1 on the target T based on the information received from the angle information unit 662. The Y-direction position calculation unit 663 sends the calculated positional information to the output unit 664.

The output unit 664 links the information on the reflection position P1 obtained from the Y-direction position calculation unit 663 with the Z-direction displacement information of the target T at position P1 obtained from the displacement information unit 661. The output unit 664 outputs the linked information, that is, the Z-direction displacement information of the target T at position P1.

The displacement information output unit 66 performs this processing each time the reflection position of the light shifts. As a result, it becomes possible to obtain Z-direction displacement data (Y-Z data) at plurality of positions on the target T that are offset in the Y-direction.

<Variation 1>

The accuracy of components constituting the displacement detection apparatus 6, such as lenses and birefringent units, as well as the tilt of the stage on which the target T is placed, may affect the measurement of Z-direction displacement of the target T. To reduce these effects, the displacement detection apparatus 6 may be configured as follows.

The displacement information output unit 66 may include a storage unit 665 in which calibration data is stored. The calibration data is used to eliminate errors in measuring the Z-direction displacement of the target T. The calibration data is stored in advance in the storage unit 665. The calibration data may be obtained, for example, in the following manner.

First, a reference mirror with an extremely high-precision reference surface is placed in place of the target T. The reference mirror may be a mirror whose surface flatness is known in advance. Next, the displacement detection apparatus 6 measures Y-Z data for this reference mirror in the same manner as described above. The displacement detection apparatus 6 stores the measurement results (Y-Z data) of the reference mirror as calibration data in the storage unit 665.

After that, the reference mirror is replaced with the target T. The displacement detection apparatus 6 then measures the Y-Z data of the target T in the same manner as before. When the output unit 664 obtains the Y-Z data of the target T, it retrieves the calibration data from the storage unit 665. The output unit 664 subtracts the calibration data from the Y-Z data of the target T. The calibration data includes information on the reference mirror used, as well as the accuracy of each component of the displacement detection apparatus 6 and any tilt of the pedestal. The measured Y-Z data of the target T includes not only that information, but also the information specific to the target intended to be measured. Since the reference mirror has an extremely high-precision reference surface, its flatness can be considered practically negligible. Therefore, by subtracting the calibration data from the Y-Z data of the target T, only the information specific to the target T intended to be measured can be extracted. Accordingly, with the displacement detection apparatus 6 according to Variation 1, the Z-direction displacement of the target T can be measured with higher accuracy.

<Variation 2>

Figure 24:
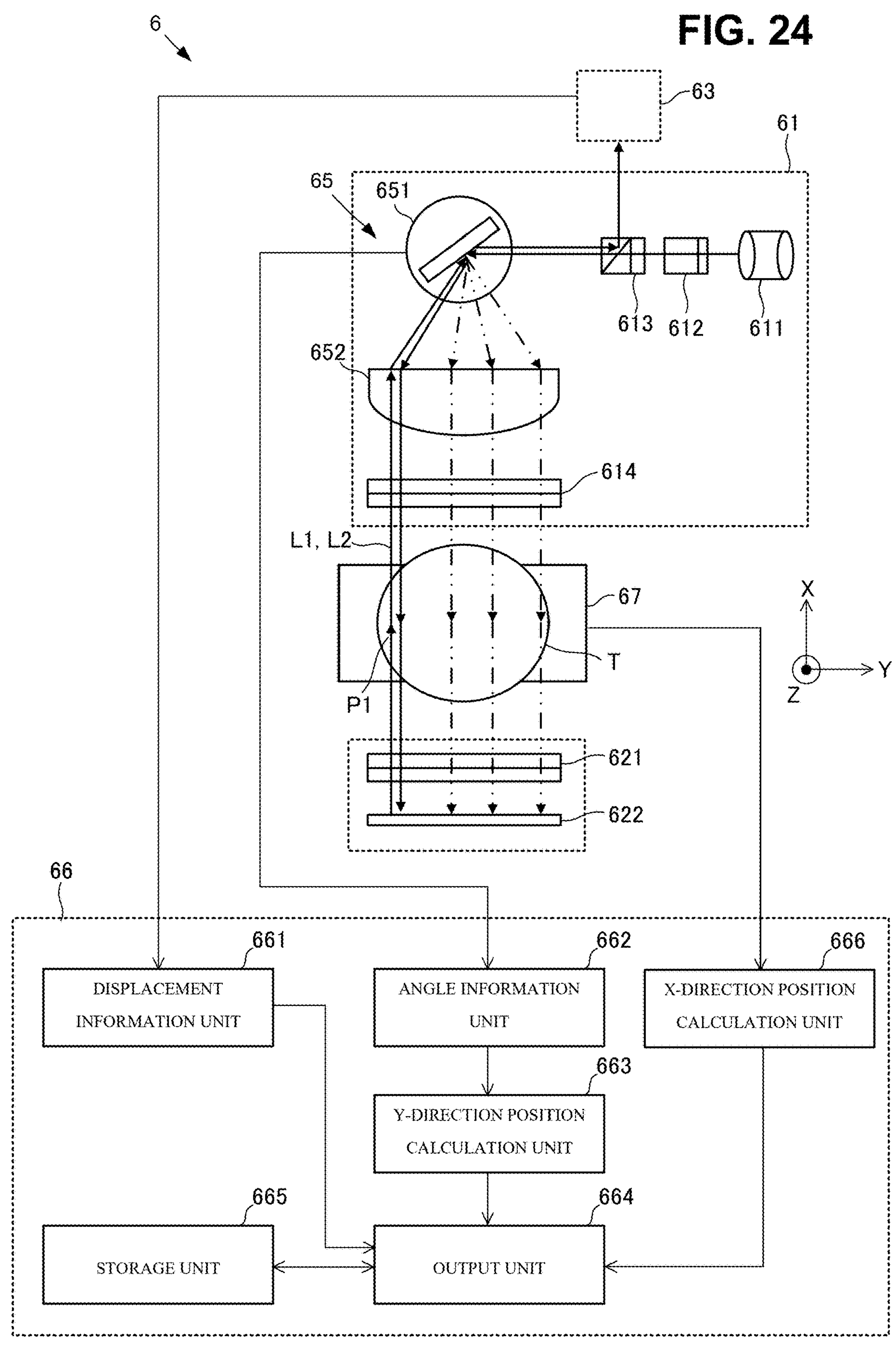
FIG. 24 is a front view showing the configuration of the displacement detection apparatus according to Variation 2 of the sixth embodiment.

FIG. 24 is a front view showing the configuration of a displacement detection apparatus according to Variation 2 of the sixth embodiment. In Variation 1 described above, the case was explained in which the displacement detection apparatus moves the displacement measurement position on the target T in the Y direction. The displacement detection apparatus of Variation 2 is capable of moving the displacement measurement position not only in the Y direction, but also in the X direction. The following describes the differences in configuration between the displacement detection apparatus of Variation 2, which is based on the displacement detection apparatus of Variation 1, and the displacement detection apparatus of Variation 1.

The displacement detection apparatus 6 includes a movable stage 67 that moves the target T in the X direction. The movable stage 67 is positioned beneath the target T. The movable stage 67 supports the target T. The movable stage 67 is configured to be movable in the X direction by a feed mechanism (not shown). The feed mechanism may be, for example, a linear slider. A linear encoder is attached to the movable stage 67. With this configuration, the Z-direction displacement measurement position (i.e., the light reflection position) on the target T can be moved not only in the Y direction, but also in the X direction.

The displacement information output unit 66 includes an X-direction position calculation unit 666 that acquires X-direction information of the light reflection position. The X-direction position calculation unit 666 calculates the X-direction position of the light reflection point based on signals from the linear encoder attached to the movable stage 67. The X-direction position calculation unit 666 then sends the calculated X-direction information to the output unit 664.

The output unit 664 links the information on the light reflection position P1 obtained from the X-direction position calculation unit 666, the information on the light reflection position P1 obtained from the Y-direction position calculation unit 663, and the Z-direction displacement information of the target T at position P1 obtained from the displacement information unit 661. The output unit 664 outputs the linked information, that is, the Z-direction displacement information of the target T at position P1. The displacement information output unit 66 performs this processing each time the reflection position of the light shifts. As a result, it becomes possible to obtain Z-direction displacement data (X-Y-Z data) at plurality of positions on the target T that are offset in the X- and Y-directions.

The output unit 664 may also calibrate the measurement data in the same manner as in Variation 1. In addition, the movable stage 67 may also move in the Y direction. In this case, the movable stage 67 may take the place of the scanning mechanism 65 in shifting the light reflection position in the Y direction. The movable stage 67 may also rotate the target T. In other words, the Z-direction displacement measurement positions may be identified not by X-Y coordinates but by polar coordinates (r-θ-Z data).

The explanations of the embodiments described above are intended solely as examples and are not limiting in any respect. Modifications and variations can be made as appropriate by a person skilled in the art. The scope of the present disclosure is indicated by the claims, not by the embodiments described above. Further, the scope of the present invention includes modifications of the embodiments that fall within the scope of the patent claims and the equivalents.

For example, in the above-described embodiments, the explanation was given for the case in which the object to be measured, where the target is set, is the surface of a semiconductor wafer. However, the object to be measured is not limited to the surface of a semiconductor wafer. For example, the object to be measured may be the processed surface of a photomask, the side surface of a photomask, the surface of a glass substrate, the side surface of a glass substrate, the surface of a semiconductor wafer coated with resist, the surface of an ingot made of Si, SiC, or GaN, the surface of a mirror or lens, the surface of a linear scale, the surface of a film, or a ground surface. The target is set on a part of these objects to be measured. Moreover, the target is not limited to a surface of the object to be measured itself. The target may be a reflective member that moves in conjunction with the displacement of the object to be measured. In short, the target only needs to be something that reflects light.

For example, in the displacement detection apparatuses of the above-described embodiments, the first birefringent unit may be separate from or integrated with the fourth birefringent unit. The second birefringent unit may be separate from or integrated with the third birefringent unit. In the displacement detection apparatus, the illumination unit, the displacement detection unit, and the displacement information output unit 14 may be configured to be distributed separately from the light reflection unit 12, or configured to be distributed as an integrated unit.

For example, in the displacement detection apparatuses of the above embodiments, the displacement direction of the target, that is, the measurement direction, was described as being in the Z-direction. However, the measurement direction may instead be in the X direction or Y direction. When the measurement direction is in the X or Y direction, the respective members of the displacement detection apparatus are arranged appropriately so as to measure displacement of the target in the X or Y direction.

For example, in the above-described embodiments, the first light beam and the second light beam that have passed through the second birefringent unit were described as being parallel. However, it is not necessary for the first light beam and the second light beam that have passed through the second birefringent unit to be parallel. In short, the displacement detection apparatus only needs to be configured such that the first light beam and the second light beam, which were split by the first birefringent unit, are ultimately superimposed in the fourth birefringent unit. As long as the first light beam and the second light beam are superimposed in the fourth birefringent unit, the refraction angles of the first light beam and the second light beam within the second birefringent unit and the third birefringent unit can be varied as needed.

For example, in the above-described embodiments, the projection optical apparatus and the displacement detection apparatus were described as being provided separately. However, the projection optical apparatus and the displacement detection apparatus may also be integrated.

LISTING OF REFERENCE CHARACTERS

1: Displacement detection apparatus
11: Illumination unit
12: Light reflection unit
13: Displacement detection unit
14: Displacement information output unit
111: Light source
112: Collimator lens
113: Polarizer
114: First birefringent unit
114A: Birefringent unit
114B: Birefringent unit
121: Second birefringent unit
121A: Birefringent unit
121B: Birefringent unit
122: Reflective member
123: Third birefringent unit
131: Fourth birefringent unit
132: Phase plate
133: Condenser lens
134: Beam splitter
135: Polarizing beam splitter
136: Polarizing beam splitter
137A: Photodetector
137B: Photodetector
137C: Photodetector
137D: Photodetector
141: Differential amplifier
142: Differential amplifier
143: A/D conversion unit
144: A/D conversion unit
145: Waveform correction unit
146: Incremental signal generator
L1: First light beam
L2: Second light beam
T: Target

The invention claimed is:

1. A displacement detection apparatus that detects displacement of a target in a measurement direction, comprising:

a light source that emits light;

a first birefringent unit that is provided in an optical path from the light source to the target to which the light is emitted, and splits the light into a first light beam and a second light beam having a phase difference with respect to the first light beam;

a second birefringent unit that is provided in optical paths of the first light beam and the second light beam each reflected from the target and refracts the first light beam and the second light beam;

a third birefringent unit that is provided in optical paths of the first light beam and the second light beam that have passed through the second birefringent unit, and converges the first light beam and the second light beam;

a fourth birefringent unit that is provided in optical paths of the first light beam and the second light beam that have passed through the third birefringent unit, and superimposes the first light beam and the second light beam; and a displacement detection unit that detects displacement of the target in the measurement direction based on a change in the phase difference between the first light beam and the second light beam that have passed through the fourth birefringent unit, wherein the second birefringent unit and the third birefringent unit are configured to vary the phase difference between the first light beam and the second light beam according to movement of the target in the measurement direction.

2. The displacement detection apparatus of claim 1, wherein:

the first light beam and the second light beam that have passed through the third birefringent unit are reflected again by the target; and the fourth birefringent unit is provided on optical paths of the first light beam and the second light beam reflected by the target.

3. The displacement detection apparatus of claim 1, wherein at least one of the first birefringent unit, the second birefringent unit, the third birefringent unit, and the fourth birefringent unit has a thickness that varies depending on the in-plane position of the incident plane wave of light.

4. The displacement detection apparatus of claim 1, wherein at least one of the first birefringent unit, the second birefringent unit, the third birefringent unit, and the fourth birefringent unit comprises two birefringent units having optical axes orthogonal to each other.

5. The displacement detection apparatus of claim 1, further comprising a scanning mechanism that changes the position on the target to which the first light beam and the second light beam are emitted, wherein the displacement detection unit detects displacement in the measurement direction at a plurality of positions on the target.

6. The displacement detection apparatus of claim 1, further comprising:

a displacement information output unit that outputs the displacement of the target in the measurement direction as detected by the displacement detection unit, wherein the displacement information output unit calibrates the displacement of the target in the measurement direction based on predetermined calibration data and outputs the calibrated displacement of the target in the measurement direction.

7. A projection optical apparatus that transfers a pattern onto an object to be measured including a target, comprising:

a mask on which a pattern to be transferred onto the object to be measured is formed;

an exposure light source that exposes the object to be measured through the mask;

a light source that is different from the exposure light source and emits light;

a first birefringent unit that is provided in an optical path from the light source to the target to which the light is emitted, and splits the light into a first light beam and a second light beam having a phase difference with respect to the first light beam;

a second birefringent unit that is provided in optical paths of the first light beam and the second light beam each reflected from the target and refracts the first light beam and the second light beam;

a third birefringent unit that is provided on optical paths of the first light beam and the second light beam that have passed through the second birefringent unit and converges the first light beam and the second light beam;

a fourth birefringent unit that is provided in optical paths of the first light beam and the second light beam that have passed through the third birefringent unit, and superimposes the first light beam and the second light beam; and a displacement detection unit that detects displacement of the target in the measurement direction based on a change in the phase difference between the first light beam and the second light beam that have passed through the fourth birefringent unit, wherein the second birefringent unit and the third birefringent unit are configured to vary the phase difference between the first light beam and the second light beam according to movement of the target in the measurement direction.

* * * * *